(12) United States Patent
Takita et al.

(10) Patent No.: US 12,407,193 B2
(45) Date of Patent: Sep. 2, 2025

(54) COIL ASSEMBLY FOR WIRELESS POWER TRANSMISSION AND POWER TRANSMISSION SYSTEM

(71) Applicant: DENSO CORPORATION, Kariya (JP)

(72) Inventors: Shimpei Takita, Kariya (JP); Eisuke Takahashi, Kariya (JP); Nobuhisa Yamaguchi, Kariya (JP); Yusei Nakayashiki, Kariya (JP)

(73) Assignee: DENSO CORPORATION, Kariya (JP)

( * ) Notice: Subject to any disclaimer, the term of this patent is extended or adjusted under 35 U.S.C. 154(b) by 51 days.

(21) Appl. No.: 18/383,654

(22) Filed: Oct. 25, 2023

(65) Prior Publication Data

US 2024/0072579 A1 Feb. 29, 2024

Related U.S. Application Data

(63) Continuation of application No. PCT/JP2022/011701, filed on Mar. 15, 2022.

(30) Foreign Application Priority Data

Apr. 26, 2021 (JP) .................. 2021-074033

(51) Int. Cl.
*H02J 50/40* (2016.01)
*H02J 50/00* (2016.01)
*H02J 50/12* (2016.01)
*H02J 50/70* (2016.01)

(52) U.S. Cl.
CPC .......... *H02J 50/402* (2020.01); *H02J 50/005* (2020.01); *H02J 50/12* (2016.02); *H02J 50/70* (2016.02)

(58) Field of Classification Search
CPC ........ H02J 50/402; H02J 50/005; H02J 50/12; H02J 50/70; H02J 50/40; H01F 27/24; H01F 27/29; H01F 27/40; H01F 27/363; H01F 38/14; B60L 53/122; Y02T 10/70
See application file for complete search history.

(56) References Cited

U.S. PATENT DOCUMENTS

| | | | |
|---|---|---|---|
| 2014/0285016 A1* | 9/2014 | Tetu ........................ | H02J 50/12 307/104 |
| 2018/0190420 A1* | 7/2018 | Tsai ....................... | B60L 53/126 |
| 2020/0126717 A1* | 4/2020 | Nakamura .............. | H02J 50/12 |
| 2023/0032749 A1* | 2/2023 | Kim ...................... | H02J 50/402 |

FOREIGN PATENT DOCUMENTS

| | | | | |
|---|---|---|---|---|
| JP | 2011-130643 A | 6/2011 | | |
| JP | 2013-051744 A | 3/2013 | | |
| JP | 2019-012731 A | 1/2019 | | |
| WO | WO-2020044450 A1 * | 3/2020 | | |
| WO | WO-2021052713 A1 * | 3/2021 | ......... | H01F 27/2847 |

* cited by examiner

*Primary Examiner* — Jared Fureman
*Assistant Examiner* — Michael J Warmflash
(74) *Attorney, Agent, or Firm* — Oliff PLC

(57) ABSTRACT

A coil assembly for wireless electrical power transmission includes a plurality of external connecting terminals, a power feeding coil, a resonant capacitor electrically connecting with the power feeding coil, and busbars each of which electrically connects between the external connecting terminals.

13 Claims, 18 Drawing Sheets

COIL ASSEMBLY FOR WIRELESS POWER TRANSMISSION AND POWER TRANSMISSION SYSTEM

The present application claims the benefit of priority of Japanese Patent Application No. 2021-74033 filed on Apr. 26, 2021, the disclosure of which is incorporated in their entirety herein by reference.

TECHNICAL FIELD

This disclosure relates generally to a coil assembly for wireless power transmission and a power transmission system.

BACKGROUND ART

A power transmission system is known which has a plurality of power feeding coils embedded in a road. The power feeding coils work to transfer electric power in a wireless mode using electromagnetic induction to a power receiving coil installed in a mobile object on the road. Each of the power feeding coils is supplied with high-frequency power using a power supply wire. The power supply wires are arranged to connect the power feeding coils with a high-frequency power source in a way taught in Patent literature 1.

PRIOR ART DOCUMENT

Patent Literature

Patent Literature 1: Japanese patent first publication No. 2013-51744

SUMMARY OF THE INVENTION

The above connection of each of the power feeding coils with the high-frequency power source may, however, result in a risk that the degree of freedom of layout of the power feeding coils may be decreased.

This disclosure may be realized in modes described below.

According to one aspect of this disclosure, there is provided a coil assembly for wireless power transmission which comprises: (a) a plurality of external connecting terminals; (b) a power feeding coil; (c) a resonant capacitor which electrically connects with the power feeding coil; and (d) busbars which electrically connect between the external connecting terminals.

When a plurality of coil assemblies of the above type are laid out, the external connecting terminals of adjacent ones of the coil assemblies are electrically connected together, thereby enabling electrical power or a signal to be delivered to the coil assemblies. This structure enhances the degree of freedom of layout of the coil assemblies.

According to the second aspect of this disclosure, there is provided a wireless power transmission system which comprise: (a) a power supply; (b) a first coil assembly; and (c) a second coil assembly. The first coil assembly includes a plurality of first-coil external connecting terminals, a first-coil power feeding coil, a first-coil resonant capacitor electrically connecting with the first-coil power feeding coil, and a first-coil busbar electrically connecting between the first-coil external connecting terminals. The coil assembly includes at least one second-coil external connecting terminal, a second-coil power feeding coil, and a second-coil resonant capacitor electrically connecting with the second-coil power feeding coil. The first coil assembly has at least one of the first-coil external connecting terminals which electrically connects with the power supply and to which electrical power is delivered from the power supply. The second coil assembly electrically connects with the first coil assembly and is supplied with the electrical power through the first-coil busbar of the first coil assembly.

When the coil assemblies are laid out, the external connecting terminals of the adjacent coil assemblies are electrically connected together, thereby enabling electrical power to be delivered to the coil assemblies. This structure enhances the degree of freedom of layout of the coil assemblies.

According to the third aspect of this disclosure, there is provided a wireless power transmission system which comprises: (a) a signal source; (b) a first coil assembly; and (c) a second coil assembly. The first coil assembly includes a plurality of first-coil external connecting terminals, a first-coil power feeding coil, a first-coil resonant capacitor electrically connecting with the first-coil power feeding coil, and a first-coil busbar electrically connecting between the first-coil external connecting terminals. The second coil assembly includes at least one second-coil external connecting terminal, a second-coil power feeding coil, and a second-coil resonant capacitor electrically connecting with the second-coil power feeding coil. The first coil assembly has at least one of the first-coil external connecting terminals which electrically connects with the signal source and to which a signal is delivered from the signal source. The second coil assembly electrically connects with the first coil assembly and is supplied with the signal through the first-coil busbar of the first coil assembly.

When the coil assemblies are laid out, the external connecting terminals of the adjacent coil assemblies are electrically connected together, thereby enabling signals to be delivered to the coil assemblies. This structure enhances the degree of freedom of layout of the coil assemblies.

BRIEF DESCRIPTION OF THE DRAWINGS

The present disclosure will be understood more fully from the detailed description given hereinbelow and from the accompanying drawings of the preferred embodiments of the invention.

In the drawings.

MODE FOR CARRYING OUT THE INVENTION

A. First Embodiment

Figure 1:
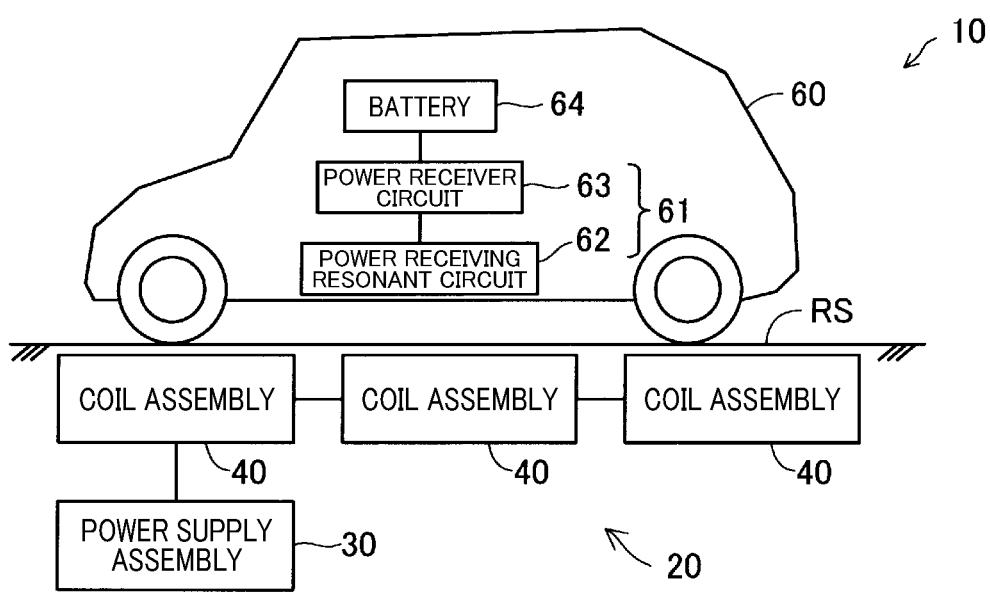
FIG. 1 is a structural view which illustrates a power transmission system according to the first embodiment.

The wireless power transmission system 10 in this embodiment is, as can be seen in FIG. 1, designed to transfer electric power from the power transmitter 20 to the vehicle 60 in a wireless mode. The wireless power transmission system 10 includes the power transmitter 20 installed in the road RS and the power receiver 61 installed in the vehicle 60. This embodiment refers to the vehicle 60 traveling on the road RS, but however, the vehicle 60 may be implemented by an operator-driven automobile or an automated guided vehicle (AGV) used in a factory or a warehouse. The power transmitter 20 does not necessarily need to be mounted in the road RS, but may be arranged at a charging station or charge point which supplies electrical power for recharging the vehicle 60.

The power transmitter 20 includes the power supply assembly 30 and a plurality of coil assemblies 40 working as a wireless power transferring device. The power supply assembly 30 and the coil assemblies 40 are embedded in the road RS. The coil assemblies 40 are arranged adjacent each other both in a lengthwise direction of the road RS that is a direction in which the vehicle 60 moves forward and in a width direction of the road RS. This embodiment refers to the coil assemblies 40 embedded inside the road RS, but however, may alternatively be arranged on or above the road RS.

The vehicle 60 is, for example, an automotive vehicle, such as an electric vehicle or a hybrid vehicle equipped with a traction motor. The vehicle 60 is equipped with the power receiver 61 and the battery 64. The power receiver 61 includes the power receiving resonant circuit 62 and the power receiver circuit 63. The power receiving resonant circuit 62 includes a power receiving coil and a resonant capacitor, not shown.

Figure 2:
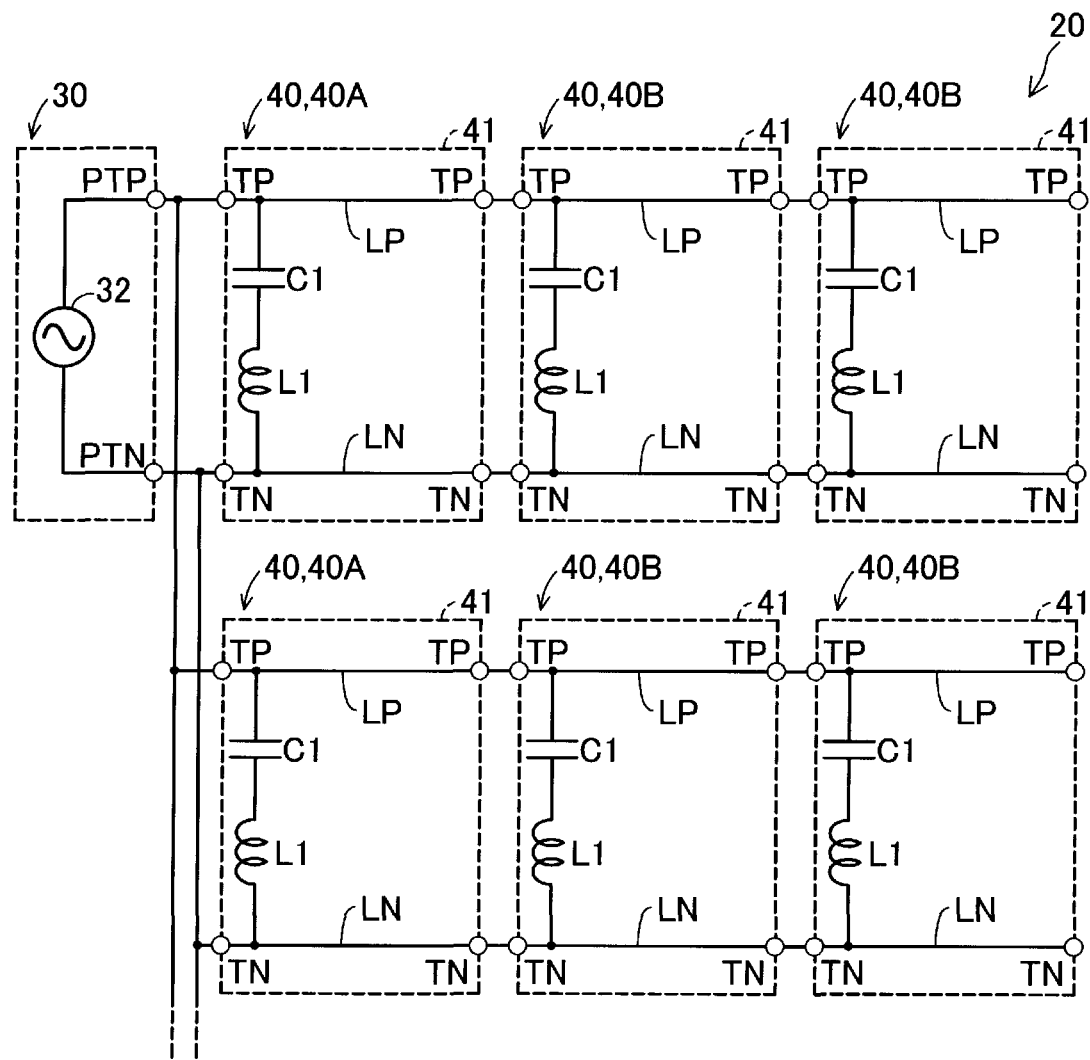
FIG. 2 is a circuit diagram which illustrates a power transmitter according to the first embodiment.

The power supply assembly 30, as illustrated in FIG. 2, has the high-frequency power source (i.e., power supply) 32 built therein. Each of the coil assemblies 40 has the power transmitting resonant circuit 41 built therein. The high-frequency power source 32 works to supply a high-frequency ac electric power to the power transmitting resonant circuits 41. The power transmitting resonant circuit 41 includes the power feeding coils L1 and the resonant capacitor C1 electrically connected to the power feeding coils L1.

The frequency in resonance of each of the power transmitting resonant circuit 41 is set substantially equal to that of the power receiving resonant circuit 62. This achieves wireless power transmission from each of the power feeding coils L1 to the power receiving coil of the power receiving resonant circuit 62 by means of magnetic resonance therebetween.

The power receiver circuit 63 in FIG. 1 works to convert ac power outputted by the power receiving resonant circuit 62 into dc power which is then delivered to the battery 64. The battery 64 is made of a secondary battery working to output dc power to actuate the traction motor operating as a drive source of the vehicle 60. The dc power outputted from the power receiver circuit 63 is used to charge the battery 64. The dc power outputted from the power receiver circuit 63 may also be used for charging an accessory battery or operating a drive motor or accessories mounted in the vehicle 60.

Figure 3:
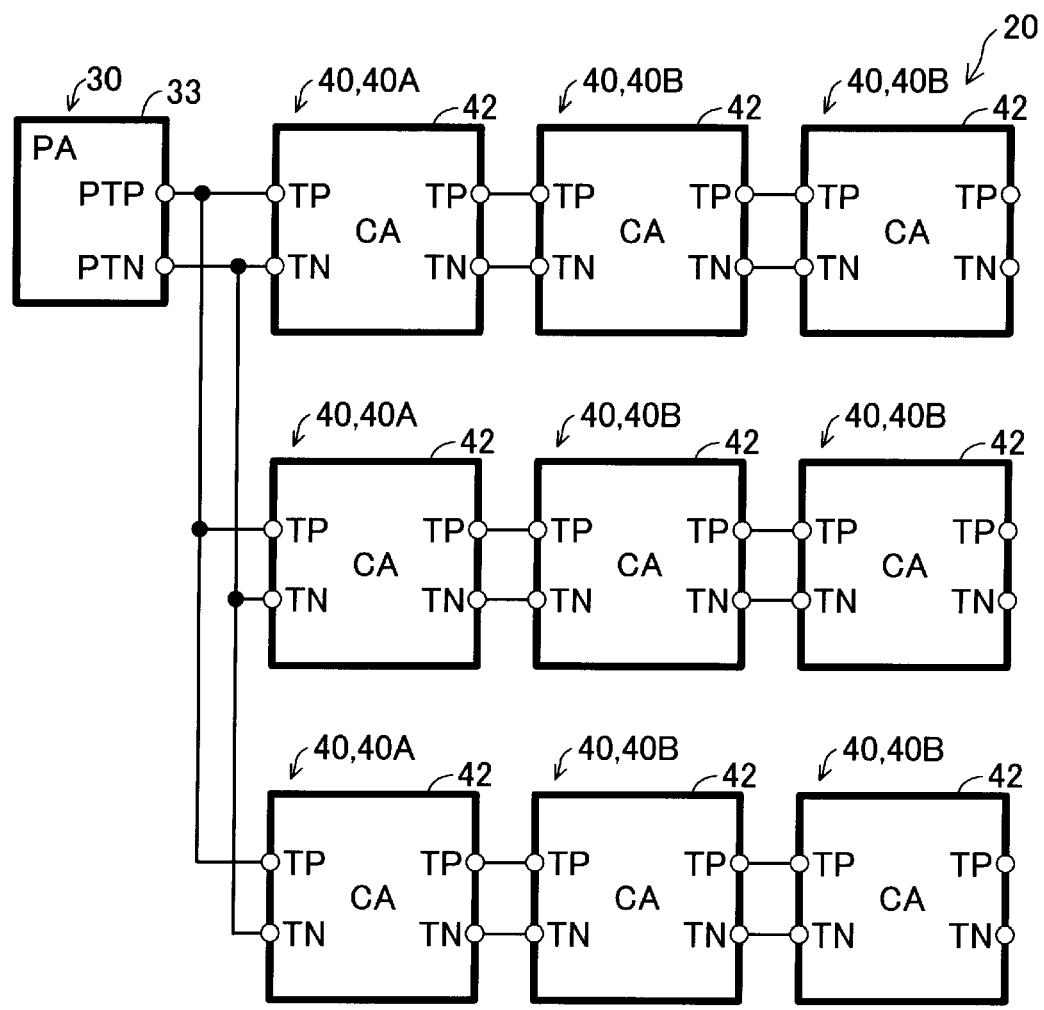
FIG. 3 is a block diagram which illustrates a power transmitter according to the first embodiment.

The power supply assembly 30, as illustrated in FIG. 3, also includes the power supply housing 33, the first power supply terminal PTP, and the second power supply terminal PTN. The high-frequency power source 32 is disposed in the power supply housing 33. The power supply housing 33 has secured thereto the first power supply terminal PTP and the second power supply terminal PTN which are exposed outside the power supply housing 33. Each of the coil assemblies 40 includes the coil housing 42, two first external connecting terminal TP serving as external connecting terminals (i.e., power supply terminals), and two second external connecting terminal TN serving as external connecting terminals (i.e., power supply terminals). The power transmitting resonant circuits 41 are disposed in the coil housings 42. Each of the coil housing 42 has secured thereto the first external connecting terminals TP and the second external connecting terminals TN which are exposed outside the coil housing 42. The first external connecting terminals TP and the second external connecting terminals TN are each made of waterproofing connectors. Each of the coil assemblies 40 is disposed in a respective one of the coil housings 42, thereby facilitating the ease with which a total number of the coil assemblies 40 may be incremented or decremented in units of one depending upon a place of installation thereof.

Some of the coil assemblies 40 are connected directly to the power supply assembly 30, while the remaining coil assemblies 40 are connected indirectly to the power supply assembly 30. In the following discussion, the coil assemblies 40 connected directly to the power supply assembly 30 will also be referred to as the first coil assemblies 40A, while the coil assemblies 40 connected indirectly to the power supply assembly 30 will also be referred to as the second coil assemblies 40B. "direct connection", as referred to therein, means that a terminal(s) of a first device is electrically connected to a terminal(s) of a second device through a wire, specifically, the first external connecting terminals TP and the second external connecting terminal TN of the coil assemblies 40 are electrically connected to the first power supply terminal PTP and the second power supply terminal PTN of the high-frequency power source 32 using wires. In the following discussion, wire(s) is an electrical conductor(s), such as a cable(s) made of a conductor(s) covered with an insulator, a conductor(s) printed on a printed circuit board, or a busbar(s), through which electric power or a signal is transmitted. Each of the first coil assemblies 40A has the first external connecting terminal TP and the second external connecting terminal TN which are connected electrically with the first power supply terminal PTP and the second power supply terminal PTN of the high-frequency power source 32 through wires, while each of the second coil assemblies 40B has the first external connecting terminal TP and the second external connecting terminal TN which are electrically connected to the first external connecting terminal TP and the second external connecting terminal TN of one of the first coil assemblies 40A or one of the second coil assemblies 40B through wires. Specifically, the electrical connection of one of the second coil assemblies 40B with one of the first coil assemblies 40A is achieved by connecting the first external connecting terminal TP and the second external connecting terminal TN of the one of the second coil assemblies 40B with one of the first external connecting terminals TP of the first coil assembly 40A which is not connected directly to the first power supply terminal PTP of the high-frequency power source 32 and one of the second external connecting terminals TN of the first coil assembly 40A which is not connected directly to the second power supply terminal PTN of the high-frequency power source 32.

In the following discussion, the first external connecting terminals TP and the second external connecting terminals TN of each of the first coil assemblies 40A will also be referred to below as first-coil external connecting terminals. The first external connecting terminals TP and the second external connecting terminals TN of each of the second coil assemblies 40B will also be referred to below as second-coil external connecting terminals.

The high-frequency power source 32, as can be seen in FIG. 2, serves to output ac electric power to an external load using the first power supply terminal PTP and the second power supply terminal PTN. The coil assemblies 40 also include the first busbars LP and the second busbars LN. Each of the first busbars LP is a busbar electrically connecting the two first external connecting terminals TP of each of the coil assemblies 40 together. Similarly, each of the second busbars LN is a busbar electrically connecting the two second external connecting terminals TN of each of the coil assemblies 40 together. In each of the coil assemblies 40, the resonant capacitor C1 and the power feeding coils L1 are connected in series with each other between the first busbar LP and the second busbar LN to form an LC circuit (i.e., resonant circuit). The ac electric power is supplied to the resonant capacitor C1 and the power feeding coils L1 through the first busbar LP and the second busbar LN. The resonant capacitor C1 and the power feeding coils L1 may alternatively be connected in parallel to each other to create a resonant circuit.

The power feeding coil L1 of each of the first coil assemblies 40A will also be referred to as a first-coil power feeding coil. The power feeding coil L1 of each of the second coil assemblies 40B will also be referred to as a second-coil power feeding coil. The first busbar LP and the second busbar LN of the first coil assemblies 40A will also be referred to as first coil busbars. The first busbar LP and the second busbar LN of the second coil assemblies 40B will also be referred to as second coil busbars. The resonant capacitor C1 of each of the first coil assemblies 40A will also be referred to as a first coil resonant capacitor. The resonant capacitor C1 of each of the second coil assemblies 40B will also be referred to as a second coil resonant capacitor.

Each of the second coil assemblies 40B is supplied with ac electric power through one of the first coil assemblies 40A or both one of the first coil assemblies 40A and one of the second coil assemblies 40B. Specifically, the second coil assemblies 40B directly leading to the first coil assemblies 40A are supplied with ac electric power using the first busbars LP and the second busbars LN of the first coil assemblies 40A, while the second coil assemblies 40B indirectly leading to the first coil assemblies 40A are supplied with ac electric power using the first busbars LP and the second busbars LN of the second coil assemblies 40B electrically connecting with the first busbars LP and the second busbar LN of the first coil assemblies 40A. As apparent from the above discussion, each of the coil assemblies 40 is equipped with the plurality of first external connecting terminals TP, the plurality of the second external connecting terminals TN, the first busbar LP, and the second busbar LN and thus functions as an electrical connecting wire. This enables electric power to be transferred from the power supply assembly 30 to the coil assemblies 40 indirectly connecting with the power supply assembly 30 as well as those directly connecting with the power supply assembly 30. This results in an improved degree of freedom of layout of the coil assemblies 40. For instance, if each of the coil assemblies 40 is designed only to have a single first external connecting terminal TP and a single second external connecting terminal TN and not to have the first busbar LP and the second busbar LN, in other words, it does not function as an electrical connecting wire, it requires a need for electrically connecting each of the coil assemblies 40 directly with the power supply assembly 30. Particularly, the supply of electric power to one(s) of the coil assemblies 40 surrounded by the other coil assemblies 40 needs to secure space for layout of power supply wires connecting the one(s) of the coil assemblies 40 directly with the power supply assembly 30. In contrast to the above arrangements, the structure in this embodiment is capable of electrically connecting one(s) of the coil assemblies 40, which is (are) difficult to arrange power supply wires therearound, with the power supply assembly 30 using an adjacent one(s) of the coil assemblies 40, thereby enhancing the degree of freedom of layout of the coil assemblies 40. The electrical connection of the second coil assemblies 40B with the adjacent coil assemblies 40 enables electric power to be delivered to the second coil assemblies 40B, thereby improving the workability to arrange the coil assemblies 40 and facilitating the layout of the coil assemblies 40. For instance, when it is required to increase the coil assemblies 40, and each of the coil assemblies 40 does not function as an electrically connecting wire, it requires a need for layout of power supply wires leading from the power supply assembly 30. The structure of each of the coil assemblies 40 in this embodiment does serves as an electrically connecting wire, thus achieving electrical connection of additional coil assemblies 40 with the power supply assembly 30 by connecting them to the existing coil assemblies 40. This improves the workability to arrange the coil assemblies 40 and facilitates the layout of the coil assemblies 40.

This embodiment refers to the layout of the nine coil assemblies 40, but however, may alternatively be realized by the power transmitter 20 designed to includes a single first coil assembly 40A and a single second coil assembly 40B. This structure also offers substantially the same beneficial advantages as those discussed above. Each of the second coil assemblies 40B is, like the first coil assemblies 40A, equipped with the plurality of first external connecting terminal TP and the plurality of second external connecting terminal TN, but however, ones of the second coil assemblies 40B which are located at ends of arrays of the second coil assemblies 40B electrically connected in series are not required to function as electrically connecting wires and thus may be designed only to include the single first external connecting terminal TP and the single second external connecting terminal TN.

Figure 4:
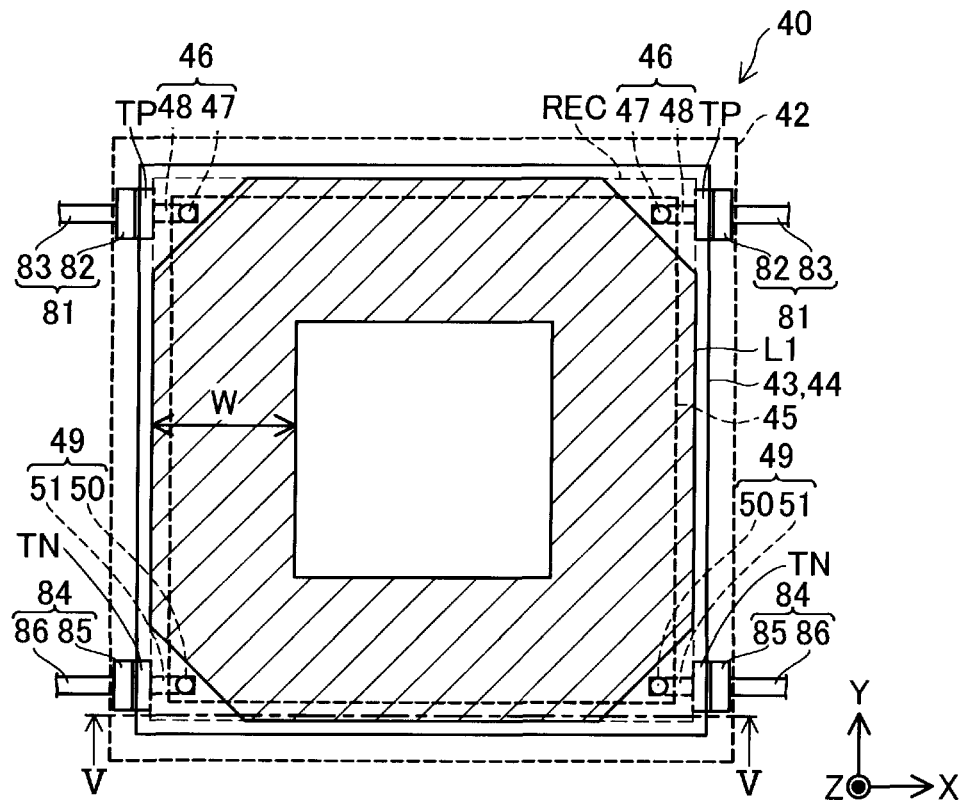
FIG. 4 is a plan view which illustrates a coil assembly according to the first embodiment.
Figure 5:
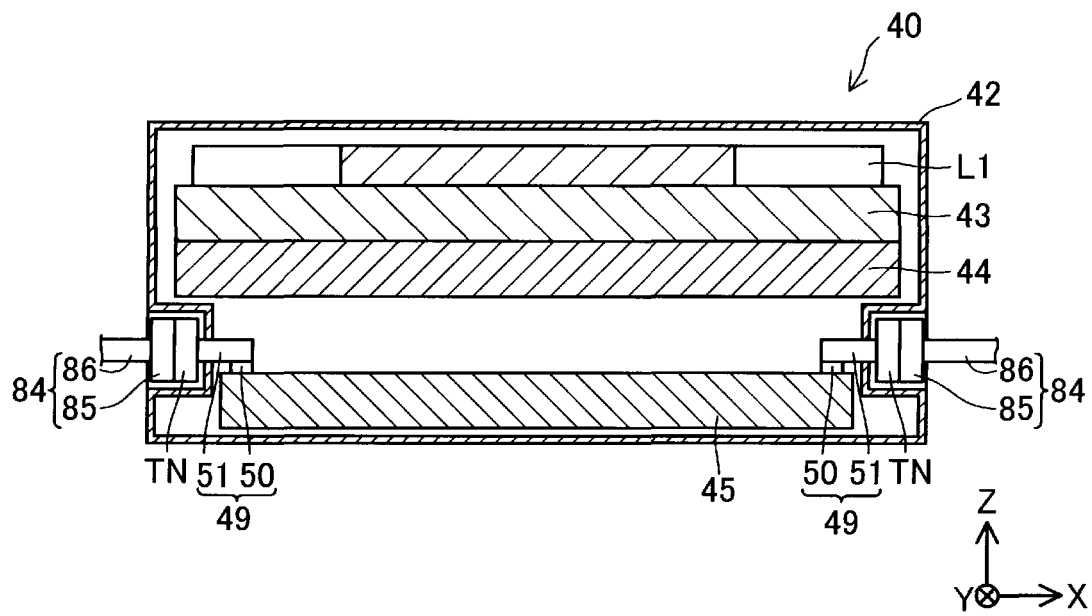
FIG. 5 is a sectional view taken along the line V-V in FIG. 4.

Each of the coil assemblies 40, as clearly illustrated in FIGS. 4 and 5, also includes the core 43, the shield 44, the busbar substrate 45, the first coil wires 46, and the second coil wires 49. In FIGS. 4 and 5, an X-axis, a Y-axis, and a Z-axis are defined which are perpendicular to each other. In the following discussion, a +Z-direction will also be referred to as an upper direction, and a −Z-direction will also be referred to as a lower direction. In each of the coil assemblies 40, the power feeding coil L1, the core 43, the shield 44, and the busbar substrate 45 are substantially of a flat-plate shape and arranged to extend parallel to an X-Y plane. The busbar substrate 45, the shield 44, the core 43, and the power feeding coil L1 are, as illustrated in FIG. 5, laid to overlap each other in this order in the upward direction. The coil assemblies 40 are arranged so that it may face the power receiving coil of the power receiver circuit 63 in the upward direction.

The first busbar LP and the second busbar LN in each of the coil assemblies 40 are partially formed by conductors printed on the busbar substrate 45 designed in the form of a printed circuit board. The resonant capacitor C1 is mounted on the busbar substrate 45. The first busbar LP and the second busbar LN are electrically connected to the resonant capacitor C1 and the power feeding coils L1 using wires, not shown. The first busbar LP and the second busbar LN may alternatively be made of cables without use of the conductors printed on the busbar substrate 45. The resonant capacitor C1 may alternatively be mounted on an additional circuit board placed on or above the busbar substrate 45.

The first coil wires 46 are, as can be seen in FIG. 4, connected to the first external connecting terminals TP. The second coil wires 49 are connected to the second external connecting terminals TN. Each of the first coil wires 46 includes the first coil terminal 47 and the first internal wire 48 electrically leading to the first coil terminal 47. The first coil terminals 47 are formed on the busbar substrate 45 in electrical connection with the first busbar KP formed on the busbar substrate 45. Each of the first coil terminals 47 and one of the first external connecting terminals TP are electrically connected together using a corresponding one of the first internal wires 48. Similarly, each of the second coil wires 49 includes the second coil terminal 50 and the second internal wire 51 electrically leading to the second coil terminal 50. Each of the second coil terminals 50 is, as can be seen in FIG. 5, formed on the busbar substrate 45 in electrical connection with the second busbar LN formed on the busbar substrate 45. Each of the second coil terminals 50 is electrically connected to one of the second external connecting terminals TN using a corresponding one of the second internal wires 51. The first coil terminals 47 and the second coil terminals 50 will also be referred to as coil terminals. The first external connecting terminals TP which are electrically connected through the first coil terminals 47 to the first busbar LP formed on the busbar substrate 45 will also be referred to as second-mode first external connecting terminals TP. The second external connecting terminals TN which are electrically connected through the second coil terminals 50 to the second bus bar LN formed on the busbar substrate 45 will also be referred to as second-mode second external connecting terminals TN. The first external connecting terminals TP and the second external connecting terminals TN in the first mode will also be described in the second embodiment. The first external connecting terminals TP and the second external connecting terminals TN are terminals which connect directly to the power supply assembly 30 or the coil assemblies 40 regardless of the modes in this disclosure.

The first power supply wires 81 are, as clearly illustrated in FIG. 4, connected to the first external connecting terminals TP. Similarly, the second power supply wires 84 are connected to the second external connecting terminals TN. Each of the first power supply wires 81 includes the first wire terminal 82 and the first external wire 83 electrically connecting with the first wire terminal 82. Similarly, each of the second power supply wires 84 includes the second wire terminal 85 and the second external wire 86 electrically connecting with the second wire terminal 85. The first external wires 83 and the second external wires 86 are made of, for example, electrical cables. The first external connecting terminals TP, the second external connecting terminals TN, the first wire terminals 82, and the second wire terminals 85 are made of, for example, waterproof connectors. The first external connecting terminals TP are different in configuration or shape from the second external connecting terminals TN. The first wire terminals 82 are contoured in shape to conform with the first external connecting terminals TP. Similarly, the second wire terminals 85 are contoured in shape to conform with the second external connecting terminals TN. The first wire terminals 82 are, therefore, different in shape from the second wire terminals 85. This minimizes a risk that the second wire terminals 85 may be connected in error to the first external connecting terminals TP or the first wire terminals 82 may be connected in error to the second external connecting terminals TN.

FIG. 4 illustrates a region in which the power feeding coil L1 is disposed using hatching. In this embodiment, each of the power feeding coils L1 is produced by a stack of a plurality of printed boards on each of which a C-shaped conductor is printed. The C-shaped conductors of the printed boards are arranged adjacent to each other, in other words, overlap each other in the Z-axis direction and are electrically connected with each other to define a spiral wire. Each of the power feeding coils L1 is configured to have a shape which is, as viewed in the Z-axis direction (i.e., a planar view), identical with that of a rectangle REC from which triangular corners thereof are omitted. The first coil terminals 47 and the second coil terminals 50 are arranged in regions corresponding to the triangular corners of the rectangle REC. Each of the power feeding coils L1 is, as described above, made of a string of the printed conductors. It is advisable that the printed conductors have widths substantially identical with each other in order to have electrical resistances which are substantially uniform over a length of the power feeding coils L1. In a case where C-shaped printed conductors are arranged in a rectangular layout region, a width or dimension of a portion of each of the C-shaped printed conductors in a direction passing through midpoints of two opposing sides of the rectangular layout region is usually minimized (i.e., width Win FIG. 4). Each of the C-shaped printed conductors may, therefore, have portions which are located on diagonal lines of the rectangular layout region (i.e., the rectangle REC) with the triangular corners omitted and have widths or dimensions substantially identical with the width W. The structure of each of the coil assemblies 40, therefore, enables the first coil terminals 47 and the second coil terminals 50 to be arranged in the regions configured to conform with the shape of the triangular corners of the rectangle REC without undesirably increasing the electrical resistance of the C-shaped printed conductors forming each of the power feeding coils L1.

Each of the power feeding coils L1 in this embodiment is, as described above, made of the printed conductors, but however, may alternatively be made of a helix or spiral coil wire made of a conductor covered with an insulating layer.

In each of the coil assemblies 40, the core 43 is, as clearly illustrated in FIG. 5, disposed between the power feeding coil L1 and the busbar substrate 45. The core 43 is made from material, such as ferrite, which has a high degree of magnetic permeability. The core 43 serves to enhance the efficiency in transferring electrical power from the power feeding coil L1. In the absence of the core 43, there is a risk that magnetic flux, as generated by the power feeding coil L1, may cause eddy current to occur in the first busbar LP or the second busbar LN on the busbar substrate 45, thereby resulting in a loss in transferring the electrical power. The use of the core 43 will facilitate the ease with which the magnetic flux generated by the power feeding coil L1 passes through the core 43, thus resulting in a decreased amount of magnetic flux passing through the busbar substrate 45, which reduces the loss in transferring the electrical power arising from the generation of eddy current. This enhances the efficiency in transmitting the electric power from the coil assemblies 40. The shield 44 is disposed between the power feeding coil L1 and the busbar substrate 45. The shield 44 is made from, for example, aluminum and serves to reduce propagation of electromagnetic waves to the busbar substrate 45, thereby reducing the generation of noise in the first busbar LP and the second busbar LN.

Each of the coil assemblies 40 in the first embodiment, as already described, includes the first external connecting terminals TP, the second external connecting terminals TN, the first busbar LP connecting the first external connecting terminals TP together, and the second busbar LN connecting the second external connecting terminals TN together. The layout of the coil assemblies 40 is, therefore, achieved by connecting the power supply assembly 30 with a selected one(s) of the coil assemblies 40, electrically connecting the first external connecting terminals TP of the adjacent coil assemblies 40 together, and also electrically connecting the second external connecting terminals TN of the adjacent coil assemblies 40 together, thereby enabling electrical power to be delivered from the power supply assembly 30 to the coil assemblies 40. This improves the degree of freedom of layout of the coil assemblies 40.

Each of the coil assemblies 40, as described above, includes the core 43 interposed between the power feeding coil L1 and the busbar substrate 45 on which the first busbar LP and the second busbar LN are mounted, thereby enhancing the efficiency in transferring electrical power from the coil assembly 40. Each of the coil assemblies 40 also includes the shield 44 interposed between the power feeding coil L1 and the busbar substrate 45 on which the first busbar LP and the second busbar LN are mounted, thereby reducing the generation of noise in the first busbar LP and the second busbar LN. The first external connecting terminals TP are different in shape from the second external connecting terminals TN, thereby eliminating a risk that they may be electrically connected in correctly with the first wire terminals 82 or the second wire terminals 85.

B. Second Embodiment

Figure 6:
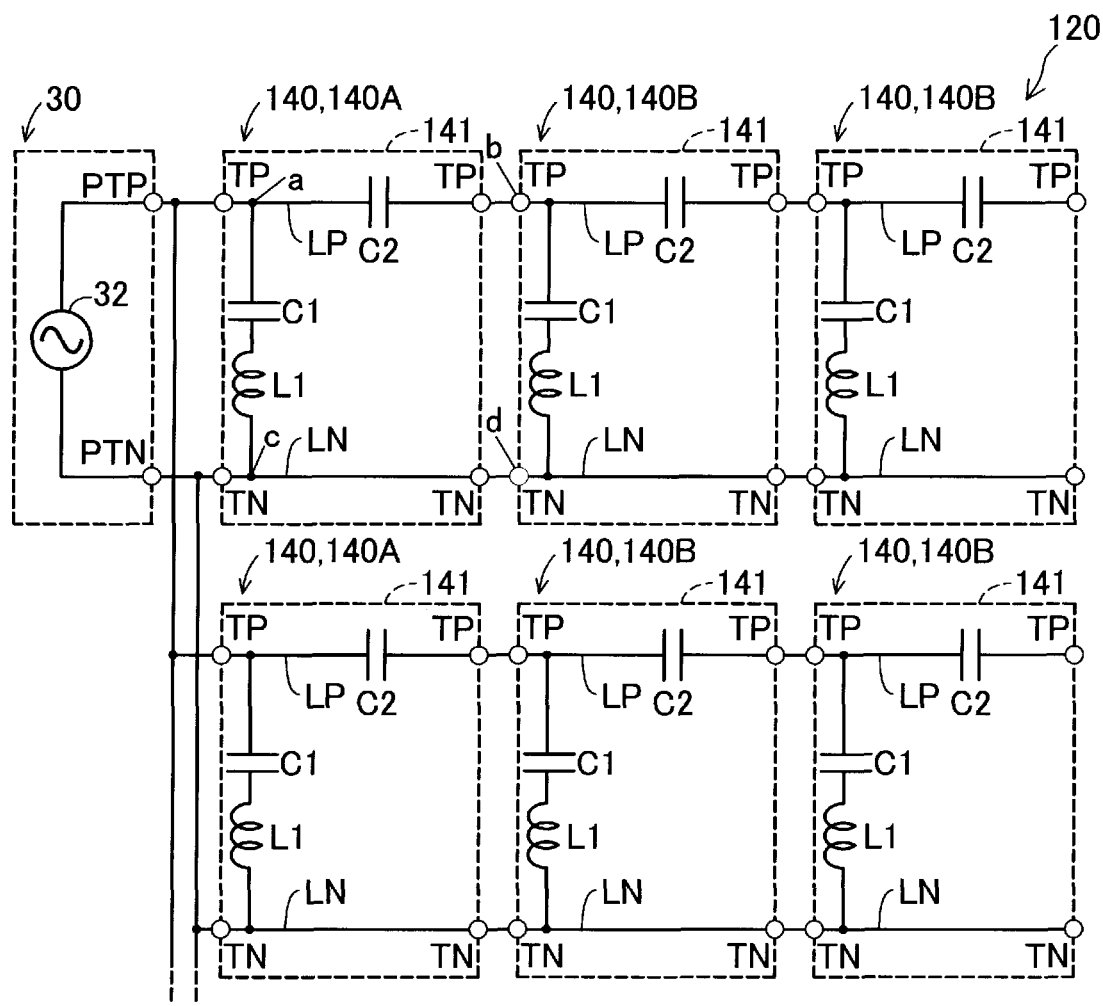
FIG. 6 is a circuit diagram which illustrates a power transmitter according to the second embodiment.

The power transmitter 20 in the second embodiment includes the coil assemblies 140 which are different in circuit and structure from the coil assemblies 40 in the first embodiment. The same reference numbers as employed in the first embodiment will refer to the same parts, and explanation thereof in detail will be omitted here. Each of the coil assemblies 140, as illustrated in FIG. 6, includes the power transmitting resonant circuit 141 which includes the power feeding coil L1, the resonant capacitor C1, and the first compensation capacitor C2. The first compensation capacitor C2 is disposed between the two first external connecting terminals TP in electrical connection therewith. The first compensation capacitor C2 is mounted on the first busbar LP. Specifically, the first compensation capacitor C2 has a first electrode connecting with one of the first external connecting terminals TP and a second electrode connecting with the other first external connecting terminal TP. The first compensation capacitor C2 serves to cancel inductances of the first busbar LP and the second busbar LN to bring a resonant frequency of the LC circuit into agreement with a target value. The first compensation capacitor C2 also serves to reduce a drop in voltage supplied from the coil assembly 140. The capacitance C of the first compensation capacitor C2 is expressed by the following Eq. (1) where L denotes the sum of inductance of the first busbar LP between points a and b in FIG. 6 and inductance of the second busbar LN between points c and d in FIG. 6, and ω denotes angular frequency.

$$C=1/(\omega^2 \cdot L) \quad (1)$$

Figure 7:
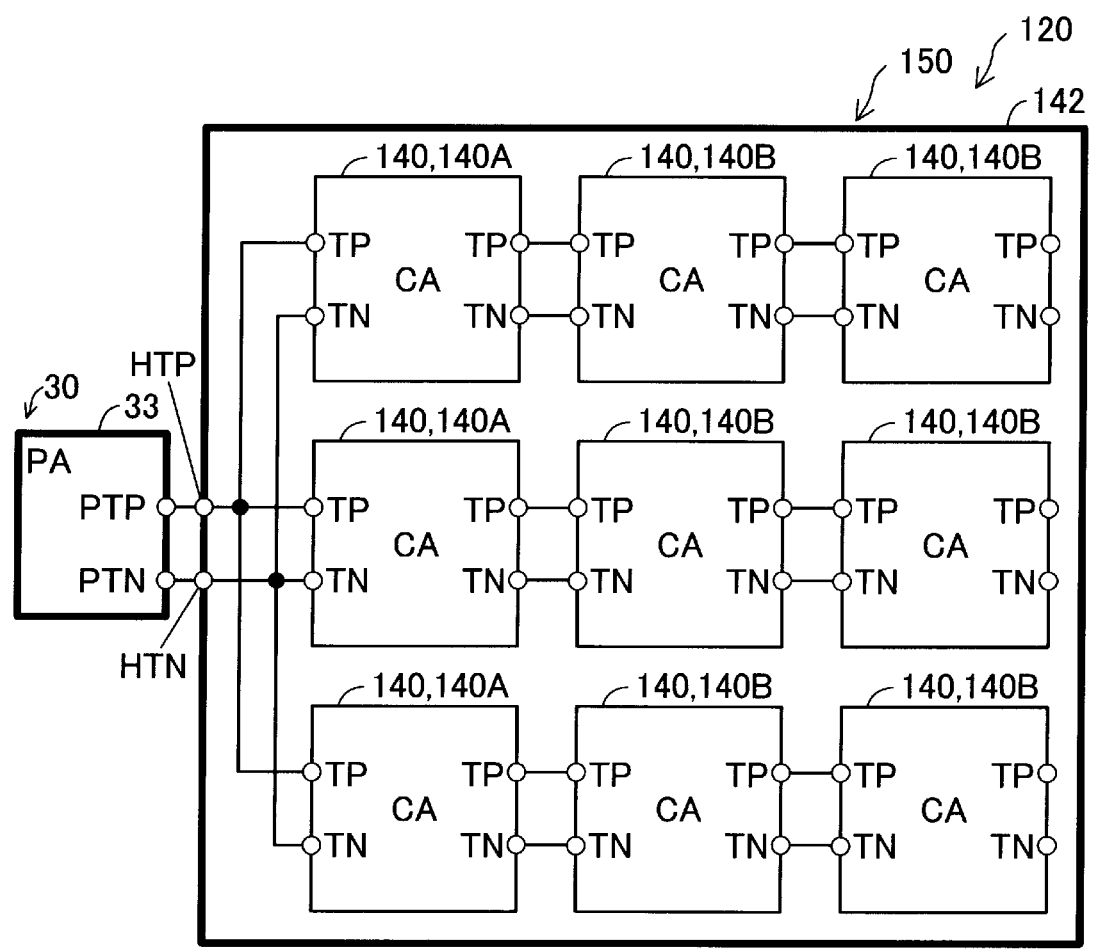
FIG. 7 is a block diagram which illustrates a power transmitter according to the second embodiment.

The power transmitter 120 in the second embodiment, as clearly illustrated in FIG. 7, includes a total of nine coil assemblies 140. Specifically, the power transmitter 120 includes three first coil assemblies 140A and six second coil assemblies 140B. The nine coil assemblies 140 are not disposed in discrete housings, but they are all arranged in the single coil housing 142. In the following discussion the coil assemblies 140 installed in the coil housing 142 will also be referred to as the coil-assembly unit 150. The coil housing 142 has the first housing connecting terminal HTP and the second housing connecting terminal HTN installed therein. The first housing connecting terminal HTP is connected directly to the first external connecting terminals TP of the first coil assemblies 140A. The second housing connecting terminal HTN is connected directly to the second external connecting terminals TN of the first coil assemblies 140A. The first housing connecting terminal HTP and the second housing connecting terminal HTN are made of waterproof connectors.

Figure 8:
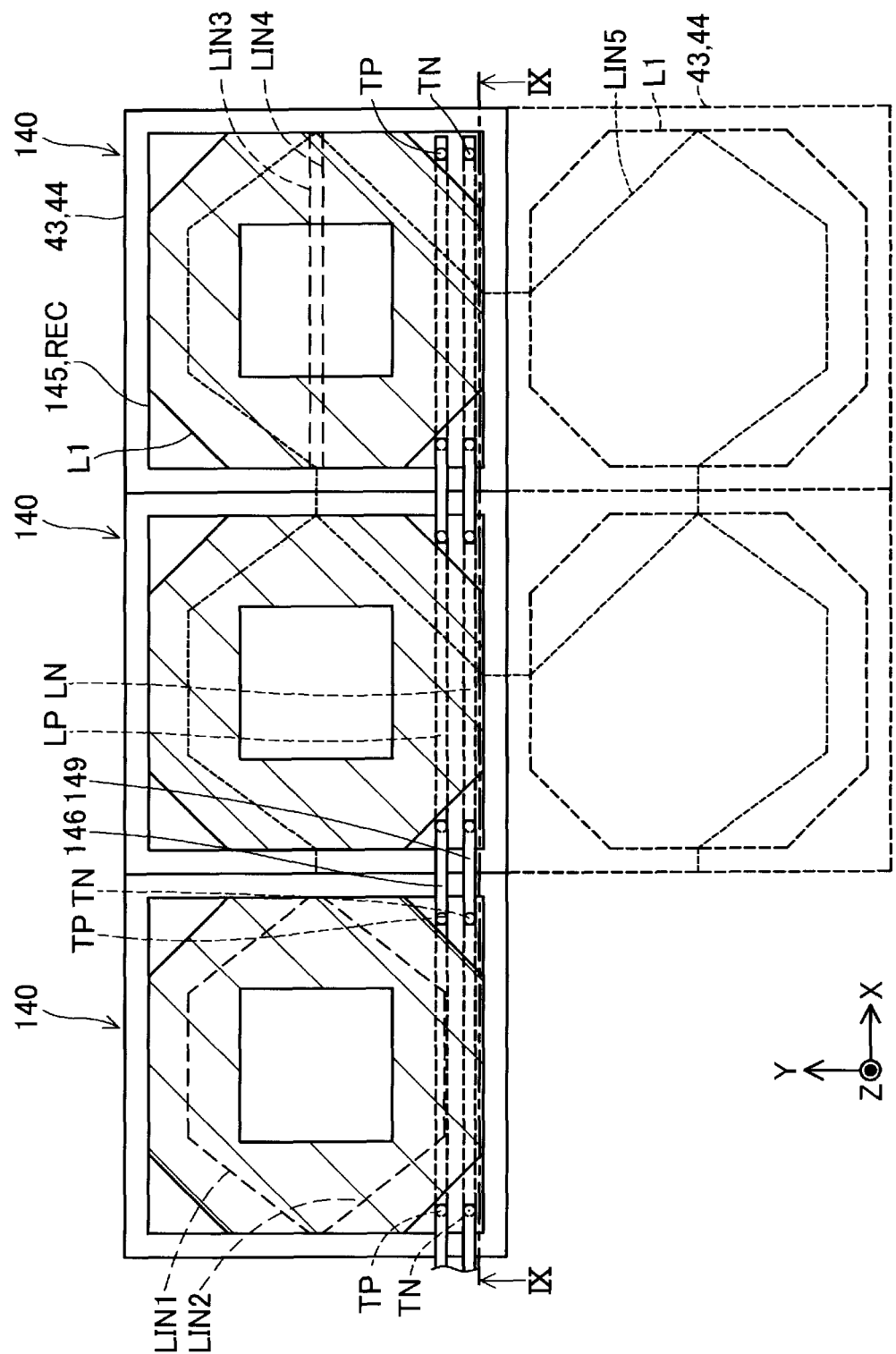
FIG. 8 is a plan view which illustrates a coil assembly according to the second embodiment.

The first external connecting terminals TP and the second external connecting terminals TN are, as clearly illustrated in FIG. 8, arranged adjacent to each other in the vicinity of corners of the rectangular busbar substrates 145. For the brevity of illustration, FIG. 8 demonstrates only three of the coil assemblies 140 which are arranged adjacent each other in the form of an array extending in the lateral direction in FIG. 7 and omits the coil housing 142. The first busbars LP and the second busbars LN are made from conductors printed on the busbar substrates 145 (i.e., printed circuit boards). The first busbars LP are located adjacent to the second busbars LN, thereby reducing noise which arises from magnetic flux generated by the power feeding coils L1 and appears in the first busbars LP and the second busbars LN. As described later in detail with reference to FIG. 9, the core 43 and the shield 44 of each of the coil assemblies 140 are disposed below the power feeding coil L1 and the busbar substrate 145, thus resulting in a risk that the first busbar LP and the second busbar LN formed on the busbar substrate 145 may be affected by magnetic field generated by the power feeding coil L1. In a case where the first busbar LP is disposed to extend along the line LIN1, and the second busbar LN is disposed to extend along the line LIN2, it will result in an increase in mutual inductance between the power feeding coil L1 and each of the first busbar LP and the second busbar LN, which facilitates generation of noise when the power feeding coil L1 is excited. In order to alleviate such a drawback, each of the coil assemblies 140 in this embodiment has the first busbar LP and the second busbar LN arranged adjacent to each other to reduce the risk of the generation of noise. The first busbar LP and the second busbar LN are also located adjacent the power feeding coil L1. Specifically, the first busbar LP and the second busbar LN are laid to overlap the power feeding coil L1 in a planar view. This decreases a risk of generation of eddy current created in the first busbar LP and the second busbar LN due to magnetic flux generated by the power feeding coil L1. The density of magnetic flux produced by the power feeding coil L1 will be lower in a region excluding around outer and inner peripheries of a layout area, as denoted by hatching in FIG. 8, occupied the power feeding coil L1 than in a region around the outer and inner peripheries of the layout area. This is because the eddy current flowing in the power feeding coil L1 (i.e., a conductor) functions to block the flow of magnetic flux. Accordingly, in a case where the first busbar LP is arranged to extend along the LIN3, and the second busbar LN is arranged to extend along the line LIN4, it facilitates the generation of eddy current in portions of the first busbar LP and the second busbar LN which lie within the annular layout region of the power feeding coil L1 due to the magnetic flux generated by the power feeding coil L1. In contrast, the structure of each of the coil assemblies 140 in this embodiment, as described above, has the first busbar LP and the second busbar LN laid to overlap with the power feeding coils L1 in a planar view thereof, thereby reducing the generation of eddy current.

For example, when the core 43 and the shield 44 are arranged below the power feeding coil L1 and the busbar substrate 145 of each of the coil assemblies 140, when each of the coil assemblies 140 has three or more first external connecting terminal TP and three or more second external connecting terminal TN, and when the coil assemblies 140 are arranged in the form of a two by two matrix, the first busbars LP and the second busbars LN of the four coil assemblies 140 may be laid out in a loop form surrounding one(s) of the power feeding coils L1. Such loop-shaped layout may create eddy current canceling magnetic flex generated by the power feeding coil(s) L1, thereby resulting in a drop in efficiency in transferring electrical power from the coil assemblies 140. FIG. 8 demonstrates the above-described layout of the first busbars LP by the line LIN5. In order to alleviate such a drawback in this embodiment, each of the coil assemblies 140 is designed to have the two first external connecting terminal TP and the two second external connecting terminal TN, thereby eliminating a risk that the first busbars LP and the second busbar LN may be arranged in a loop shape to develop the eddy current.

In this embodiment, the first busbar LP and the second busbar LN of each of the coil assemblies 140 are, as described above, made of the printed conductors, but however, may alternatively be implemented by electrical cables laid out between the power feeding coil L1 and the core 43 and between the power feeding coil L1 and the shield 44. This arrangement also offers substantially the same beneficial advantages as described above.

The first external connecting terminal TP and the second external connecting terminal TN of each of the coil assemblies 140 are, as described above, formed on the busbar substrate 145. In the following discussion, first external connecting terminal TP formed on each of the busbar substrates 145 will also be referred to as a first-mode first external connecting terminal TP. Similarly, the second external connecting terminal TN formed on each of the busbar substrates 145 will also be referred to as a first-mode second external connecting terminal TN. This embodiment is designed to have one(s) of the first external connecting terminals TP and one(s) of the second external connecting terminals TN which are electrically connected directly to the first housing connecting terminal HTP and the second housing connecting terminal HTN and one(s) of one(s) of the first external connecting terminals TP and one(s) of the second external connecting terminals TN which are electrically connected indirectly to the first housing connecting terminal HTP and the second housing connecting terminal HTN. All of the first external connecting terminals TP and the second external connecting terminals TN are disposed in or on terminal blocks, but however, may be implemented by electrical connectors. The first external connecting terminals TP and the second external connecting terminals TN which connect with the adjacent coil assemblies 140 are implemented by terminals for connection with the busbars LP and LN. The first external connecting terminals TP of a respective adjacent two of the coil assemblies 140 are connected together using the first busbar 146. The second external connecting terminals TN of a respective adjacent two of the coil assemblies 140 are connected together using the second busbar 149. The first external connecting terminals TP are different in configuration from the second external connecting terminals TN. Specifically, the first external connecting terminals TP and the second external connecting terminals TN are joined to the first busbars 146 and the second busbars 149 using screws. The first external connecting terminals TP are different in diameter of screw holes from the second external connecting terminals TN. The first busbars 146 and the second busbars 149 are identical in diameter of screw holes therein with the first external connecting terminals TP and the second external connecting terminals TN, respectively. This eliminates a risk that the first busbar 146 and the second busbar 149 may be joined in error to the coil assemblies 140. In this embodiment, the coil assemblies 140 are disposed in the coil housing 142, thereby enabling the coil assemblies 140 to be electrically connected together using low-level waterproofing conductors, such as busbars. The connection between the first external connecting terminals TP and/or between the second external connecting terminals TN may be achieved using electrical cables instead of the first busbars 146 and the second busbars 149.

Figure 9:
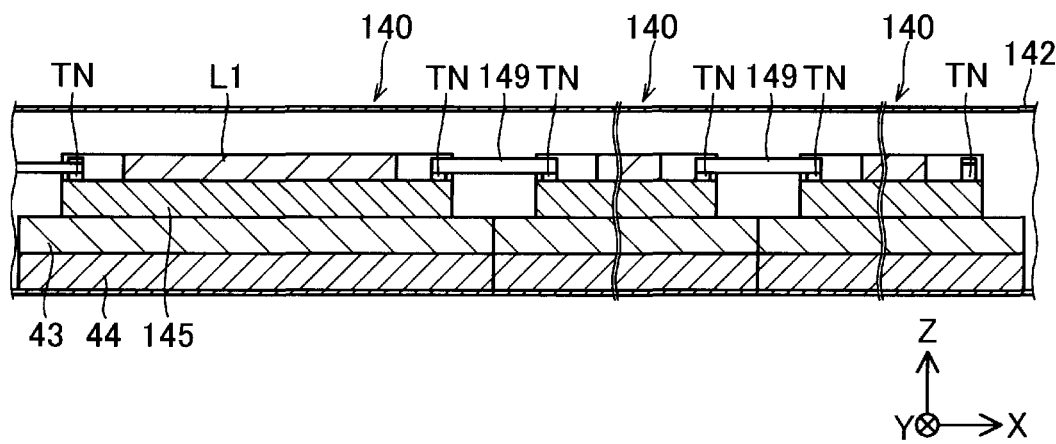
FIG. 9 is a sectional view taken along the line IX-IX in FIG. 8.

Each of the coil assemblies 140 is, as can be seen in FIG. 9, different in layout of the core 43 and the shield 44 from in the first embodiment. Specifically, the core 43 and the shield 44 are located beneath the power feeding coil L1 and the busbar substrate 145. The core 43 works to decrease the magnetic resistance and enhances the efficiency in transferring electrical power from the coil assembly 140. The shield 44 works to reduce adverse effects of external noise on the coil assembly 140 and also reduce the propagation of noise outside the coil assembly 140.

In this embodiment, the core 43 and the shield 44 of each of the coil assemblies 140 are not located between the power feeding coil L1 and the busbar substrate 145, thus resulting in a risk that the first busbar LP and the second busbar LN formed on the busbar substrate 145 may be adversely affected by magnetic field generated by the power feeding coil L1. In order to alleviate such a drawback, the first busbar LP and the second busbar LN are arranged close to each other and adjacent to the power feeding coil L1, thereby minimizing the adverse effects of the magnetic field.

The core 43 and the shield 44 are, as can be seen in FIG. 9, greater in size or major area than the power feeding coil L1 in a planar view thereof. The first external connecting terminal TP and the second external connecting terminal TN are located inside the peripheral edge of the core 43, thereby enhancing the efficiency of the power transfer from the coil assembly 140 as compared with when the first external connecting terminal TP and the second external connecting terminal TN are arranged outside the peripheral edge of the core 43. In the structure wherein the coil assemblies 140 are, as described above, disposed within the single coil housing 142, the layout of the first external connecting terminal TP and the second external connecting terminal TN inside the peripheral edge of the core 43 eliminates a risk that the first external connecting terminals TP or the second external connecting terminals TN of the adjacent coil assemblies 140 may physically interfere with each other. This enables the first external connecting terminal TP and the second external connecting terminal TN to be arranged adjacent to the core 43 through small-sized gaps, thereby resulting in a decrease in magnetic resistance thereof to the core 43. This increases the coefficient of coupling of the power feeding coil L1 with the power receiving coil, thus resulting in an increase in efficiency of the power transfer.

The first external connecting terminal TP and the second external connecting terminal TN are located inside the peripheral edge of the shield 44, thereby enhancing the efficiency in blocking noise as compared with when the first external connecting terminal TP and the second external connecting terminal TN are arranged outside the peripheral edge of the shield 44. The layout of the first external connecting terminal TP and the second external connecting terminal TN inside the peripheral edge of the shield 44 eliminates a risk that the first external connecting terminals TP or the second external connecting terminals TN of the adjacent coil assemblies 140 may physically interfere with each other. This enables the first external connecting terminal TP and the second external connecting terminal TN to be arranged adjacent to the shield 44 through small-sized gaps, thereby improving the noise shielding efficiency.

Like in the first embodiment, the power feeding coil L1 of each of the coil assemblies 140 is, as can be seen in FIG. 8, arranged, as viewed in the Z-axis direction, inside a region corresponding to the rectangle REC from which triangular corners are omitted. The first-mode first external connecting terminal TP and the first-mode second external connecting terminal TN are located in regions corresponding to the triangular corners of the rectangle REC. The busbar substrate 145 is, as clearly illustrated in FIG. 9, arranged adjacent or close to the power feeding coil L1, thereby enabling the first-mode first external connecting terminals TP and the first-mode second external connecting terminals TN to be laid out in a decreased area on the X-Y plane and also in a decreased volume of space in the Z-axis direction. As described already, when each of the power feeding coils L1 is made of a printed conductor arranged inside the region corresponding to the rectangle REC from which the triangular corners are omitted, there is no need for increasing the electrical resistance of the printed conductor. This enables the first-mode first external connecting terminals TP and the first-mode second external connecting terminals TN to be laid out in a decreased area. In a case where each of the power feeding coils L1 made of a spiral or helix turn of a conductor, the power feeding coil L1 is also of a circular shape in a planner view thereof. The power feeding coil L1, therefore, does not occupy the triangular corners of the rectangle REC, thereby enabling the first-mode first external connecting terminals TP and the first-mode second external connecting terminals TN to be formed in empty spaces (i.e., the triangular corners of the rectangle REC). In brief, even when each of the power feeding coils L1 is made of a spiral or helix conductor, the first-mode first external connecting terminals TP and the first-mode second external connecting terminals TN may be laid out in a decreased area.

The above structure in the second embodiment offers substantially the same beneficial advantages as those in the first embodiment. The layout of the first external connecting terminals TP and the second external connecting terminals TN inside the peripheral edge of the core 43 enhances the efficiency of power transfer. Additionally, the layout of the first external connecting terminals TP and the second external connecting terminals TN inside the peripheral edge of the shield 44 minimizes a risk that electrical noise may occur in the first busbar LP and the second busbar LN.

The first busbar LP and the second busbar LN are, as described above, arranged adjacent or close to each other and also to the power feeding coil L1, which minimizes the generation of eddy current in the first busbar LP and the second busbar LN, thereby resulting in a decreased risk of appearance of noise in the first busbar LP and the second busbar LN. Each of the coil assemblies 40 is equipped with the first compensation capacitor C2 in the first busbar LP, thereby minimizing a derivation of resonant frequency of the LC circuit from a target value.

Each of the power feeding coils L1 is disposed to occupy the region in a planar view thereof which corresponds to the rectangle REC from which the triangular corners are omitted. The first-mode first external connecting terminals TP and the first-mode second external connecting terminals TN are arranged to occupy the regions corresponding to the triangular corners of the rectangle REC. Such layout enables the first-mode first external connecting terminals TP and the first-mode second external connecting terminals TN to be arranged in a decreased area.

C. Third Embodiment

Figure 10:
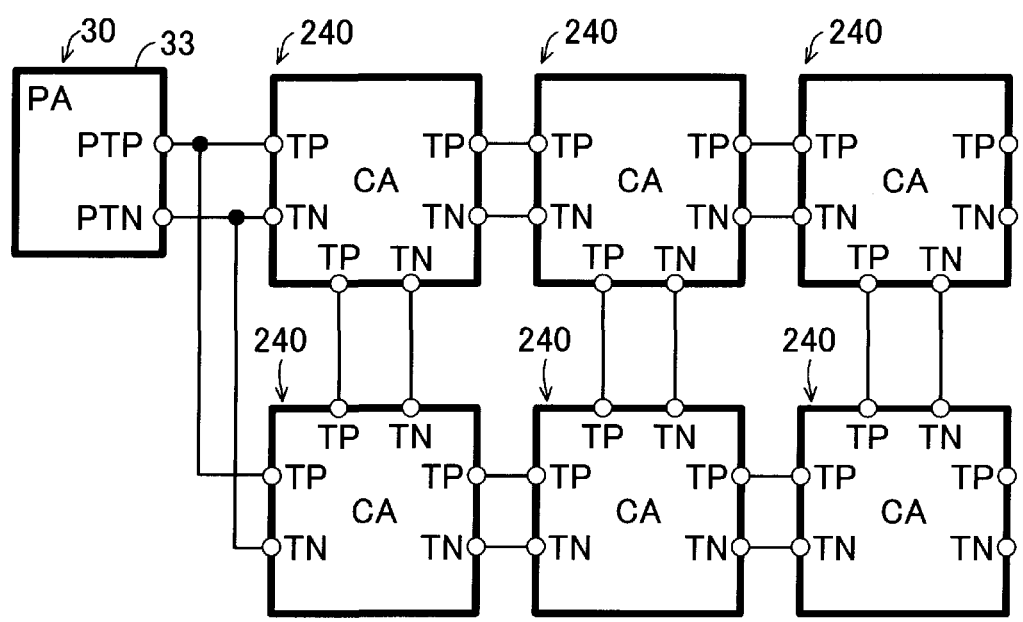
FIG. 10 is a block diagram which illustrates a power transmitter according to the third embodiment.

The power transmitter in the third embodiment, as illustrated in FIG. 10, includes the coil assemblies 240 each of which is designed to be different in number of the first external connecting terminals TP and the second external connecting terminals TN from that in the first embodiment. Specifically, each of the coil assemblies 240 is equipped with the three first external connecting terminals TP and the three second external connecting terminals TN. The first busbar LP and the second busbar LN of each of the coil assemblies 240 are, unlike in the first embodiment, made of stranded-conductor cables, but the printed conductors. Other arrangements are identical with those in the first embodiment, and explanation thereof in detail will be omitted here. The three first external connecting terminals TP are electrically connected together using the first busbar LP. Similarly, the three second external connecting terminals TN are electrically connected together using the second busbar LN. This results in a decrease in electrical resistance of the conductors in each of the coil assemblies 204 as compared with the case where each of the coil assemblies 40 or 140 is equipped with the two first external connecting terminals TP and the two second external connecting terminals TN, thereby enhancing the efficiency of power transfer. The structure of each of the coil assemblies 240 has an increased number of terminals, thereby improving the degree of freedom of layout of the terminals as compared with the case where each of the coil assemblies 40 or 140 is equipped with the two first external connecting terminals TP and the two second external connecting terminals TN. Each of the first busbar LP and the second busbar LN is, as described above, made of a stranded-conductor cable, which enables the electrical resistance of the cable to be decreased by means of an outer layer of the cable as compared with use of the printed conductor in the above embodiments.

The above-described structure of the coil assemblies 240 in the third embodiment offers substantially the same beneficial advantages as in the first embodiment and also improves the efficiency of power transfer because each of the coil assemblies 240 is equipped with the three first external connecting terminals TP and the three second external connecting terminals TN.

D. Fourth Embodiment

Figure 11:
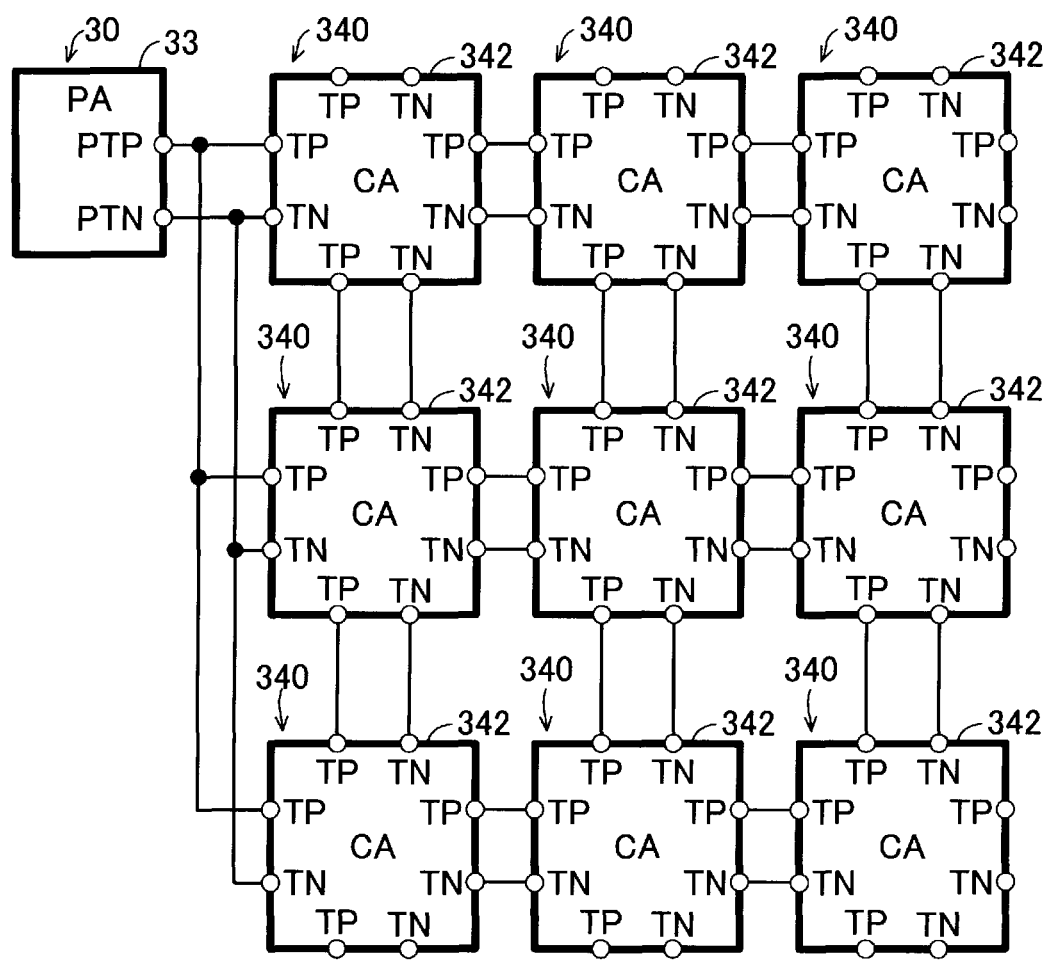
FIG. 11 is a block diagram which illustrates a power transmitter according to the fourth embodiment.

The power transmitter in the fourth embodiment, as illustrated in FIG. 11, includes the coil assemblies 340 each of which is equipped with four first external connecting terminals TP and four second external connecting terminals TN. Other arrangements are identical with those in the first embodiment, and explanation thereof in detail will be omitted here. The first external connecting terminals TP are all electrically connected together using the first busbar LP. Similarly, the second external connecting terminals TN are all electrically connected together using the second busbar LN. This results in a decrease in electrical resistance of the conductors in each of the coil assemblies 340 as compared with the case where each of the coil assemblies 40 or 140 is equipped with the two first external connecting terminals TP and the two second external connecting terminals TN, thereby enhancing the efficiency of power transfer. The first busbar LP and the second busbar LN may be made of printed conductors. It is advisable in such a case that a printed circuit board equipped with two wiring layers be used. In this case, one of the wiring layers is preferably designed to have the first busbar LP that is of a rectangular shape electrically connecting with the four first-mode first external connecting terminal TP or the first coil terminal 47, while the other wiring layer is preferably designed to have the second busbar LN that is of a rectangular shape electrically connecting with the four first-mode second external connecting terminals TN or the second coil terminal 50.

E. Fifth Embodiment

Figure 12:
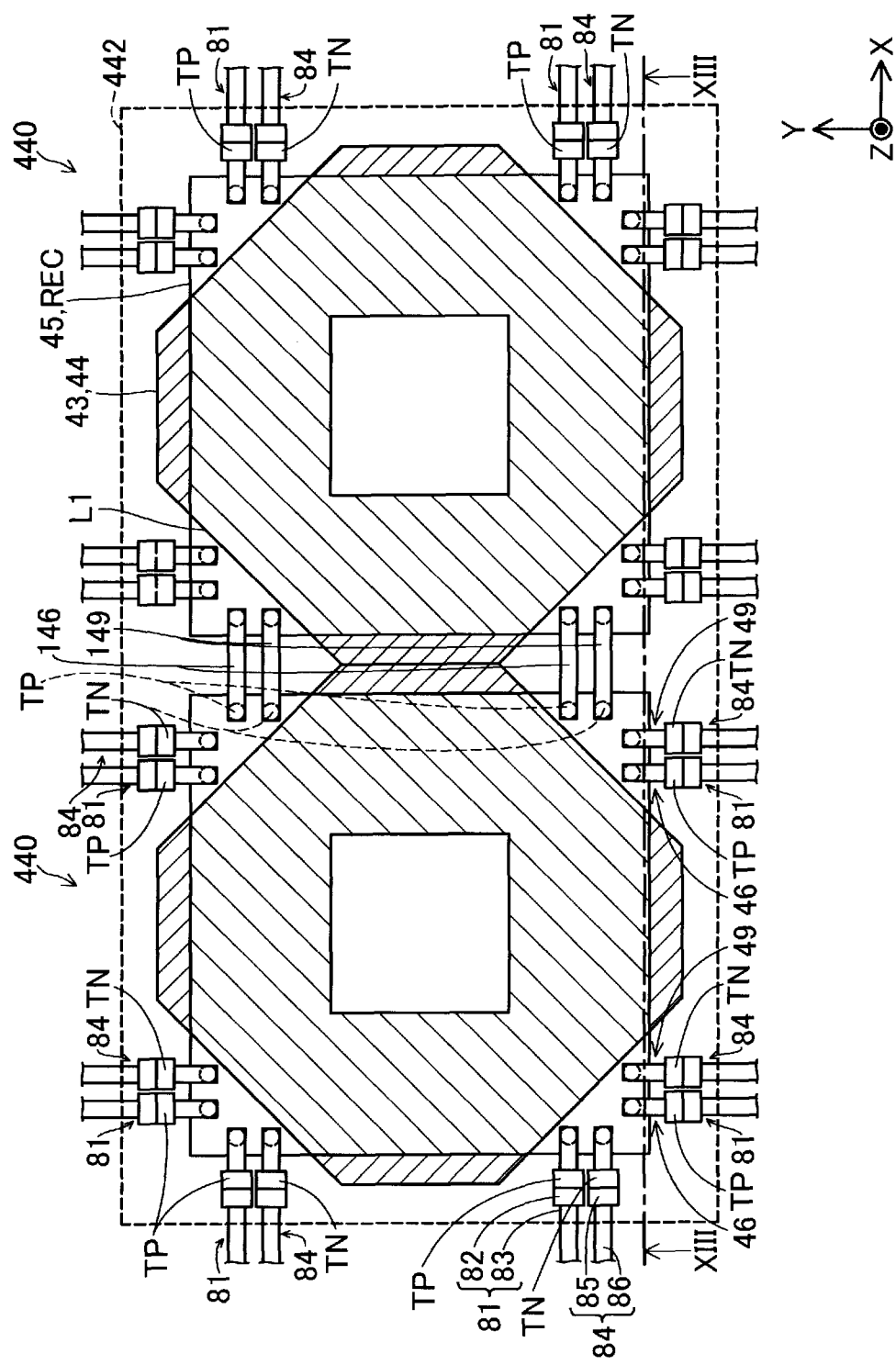
FIG. 12 is a plan view which illustrates a coil assembly according to the fifth embodiment.
Figure 13:
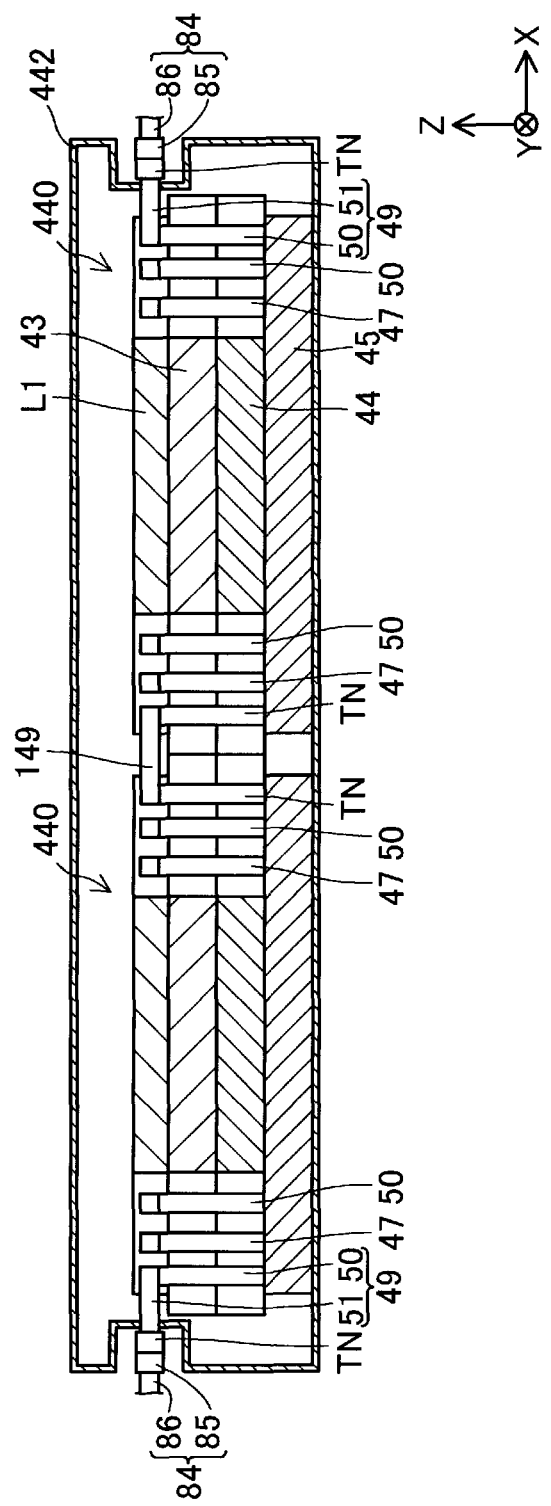
FIG. 13 is a sectional view taken along the line XIII-XIII in FIG. 12.

The power transmitter in the fifth embodiment is, unlike in the first embodiment, equipped with two coil assemblies 440 which are, as illustrated in FIGS. 12 and 13, disposed in the coil housing 442. Each of the coil assemblies 440 includes eight first external connecting terminals TP and eight second external connecting terminals TN. The first external connecting terminals TP and the second external connecting terminals TN are, as clearly illustrated in FIG. 13, arranged on or above the core 43 and the shield 44 in the Z-axis direction. In FIGS. 12 and 13, the same reference numbers or symbols as in the first embodiment denote the same parts.

The power feeding coil L1 of each of the coil assemblies 440 is, as can be seen in FIG. 12, arranged in a planar view thereof in the Z-axis direction within a region corresponding to the rectangle REC from which triangular corners thereof are omitted. Each of the core 43 and the shield 44 is shaped in a planar view thereof in the Z-axis direction by cutting out portions thereof similar to the triangular corners of the rectangle REC. The first-mode first external connecting terminals TP, the first-mode second external connecting terminals TN, the first coil terminals 47, and the second coil terminals 50 are disposed in the planar view thereof within regions corresponding to the triangular corners of the rectangle REC. The first-mode first external connecting terminals TP, the first-mode second external connecting terminals TN, the first coil terminals 47, and the second coil terminals 50, as can be seen in FIG. 13, lie at or extend to locations aligned with the power feeding coil L1 in a direction perpendicular to the Z-axis direction. This enables the first-mode first external connecting terminals TP, the first-mode second external connecting terminals TN, the first coil terminals 47, and the second coil terminal 50 which electrically connect with the second-mode first external connecting terminals TP and the second-mode second external connecting terminals TN to be disposed in a decrease volume of space.

F. Sixth Embodiment

Figure 14:
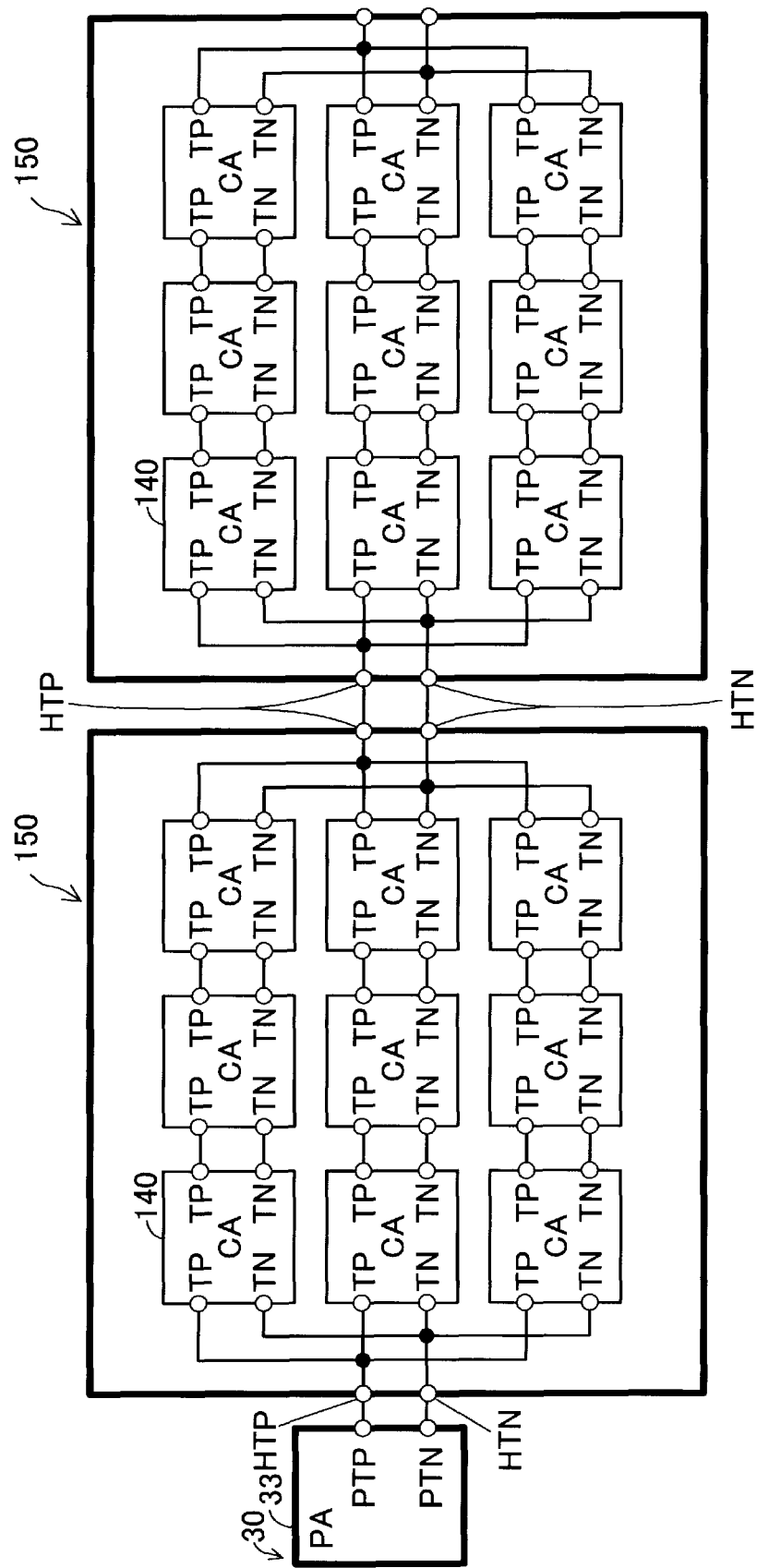
FIG. 14 is a block diagram which illustrates a power transmitter according to the sixth embodiment.

The power transmitter in the sixth embodiment is, as illustrated in FIG. 14, equipped with the coil assemblies 140 which are identical in structure with those in the second embodiment. Specifically, the power transmitter in the sixth embodiment has two coil-assembly units 150 each of which includes the nine coil assemblies 140 disposed in the coil housing 142. The coil-assembly units 150 are electrically connected together. Each of the coil housings 142 has mounted therein the first housing connecting terminals HTP and the second housing connecting terminals HTN which are electrically connected together to deliver electrical power to the coil assemblies 140 of each of the coil-assembly units 150.

G. Seventh Embodiment

Figure 15:
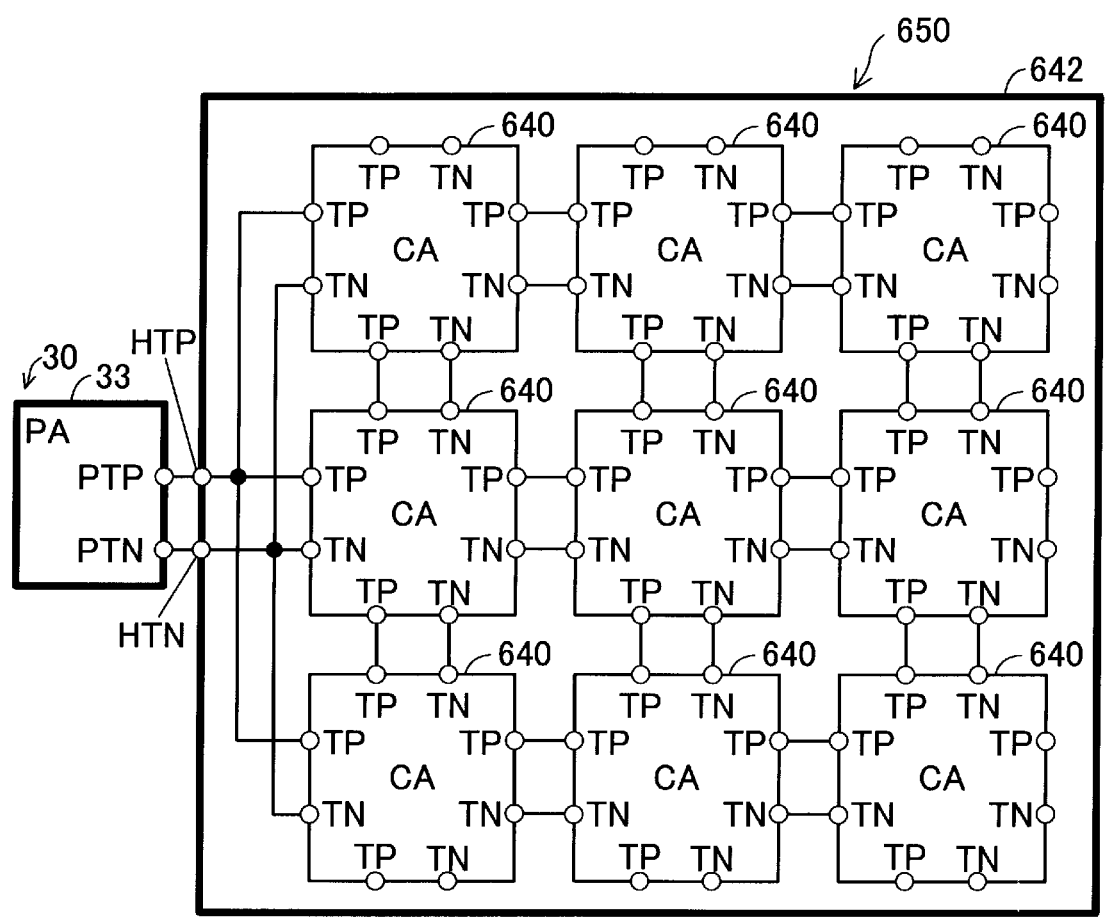
FIG. 15 is a block diagram which illustrates a power transmitter according to the seventh embodiment.

The power transmitter in the seventh embodiment is, as illustrated in FIG. 15, equipped with nine coil assemblies 640 each of which, like in the first embodiment, has the core 43 and the shield 44 between the power feeding coil L1 and the busbar substrate 45. Each of the coil assemblies 640, unlike in the first embodiment, includes four first external connecting terminals TP and four second external connecting terminals TN. All the coil assemblies 640 are disposed in the coil housing 642 in the form of a coil-assembly unit 650. In FIG. 15, the same reference numbers as employed in the first embodiment refer to the same parts. The coil housing 642, like in the second embodiment, has the first housing connecting terminal HTP and the second housing connecting terminal HTN.

H. Eighth Embodiment

Figure 16:
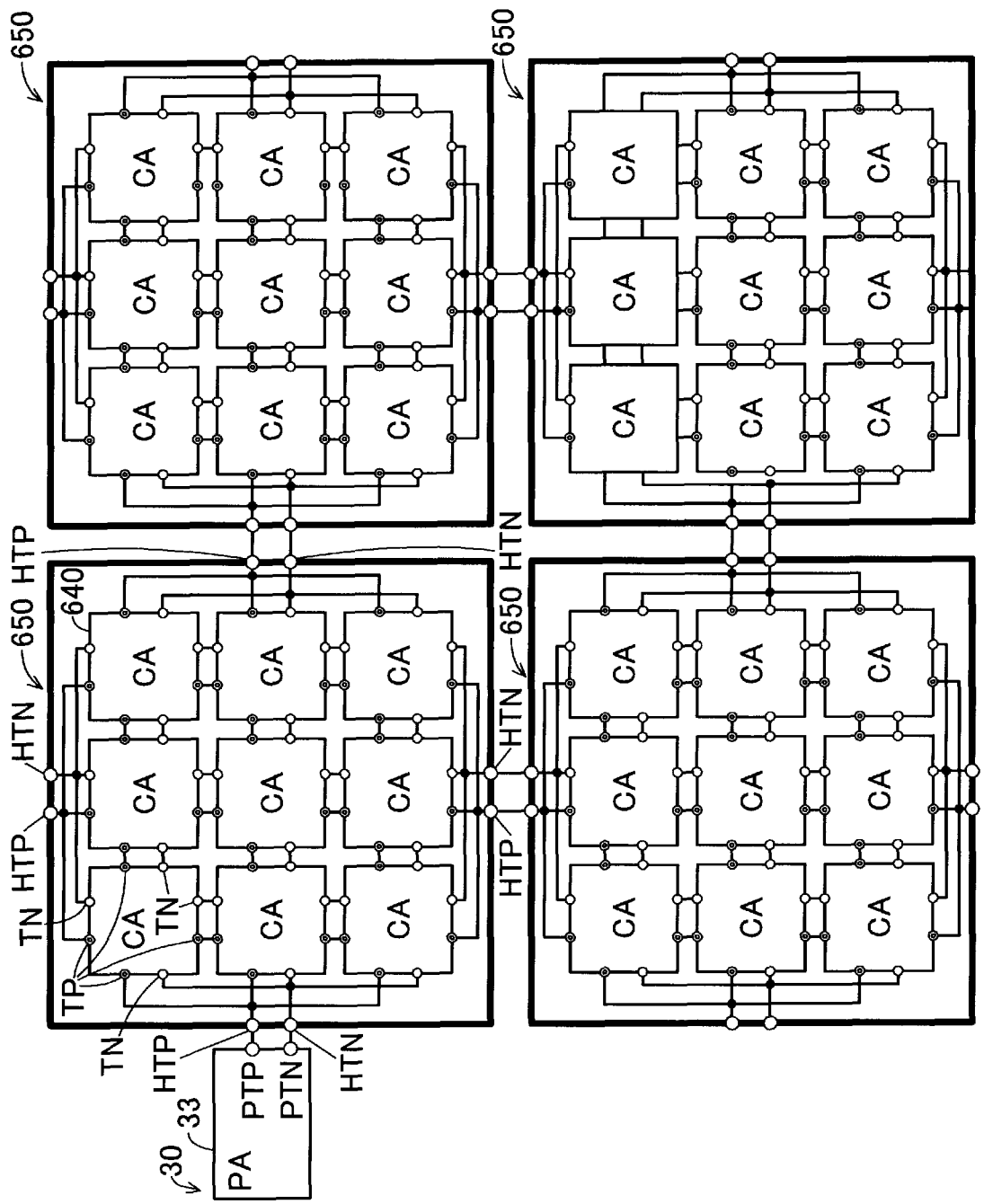
FIG. 16 is a block diagram which illustrates a power transmitter according to the eighth embodiment.

The power transmitter in the eighth embodiment is, as illustrated in FIG. 16, equipped with four coil-assembly units 650 each of which has disposed therein nine coil assemblies 640 which are identical in structure with those in the seventh embodiment. The coil-assembly units 650 are electrically connected together in the same way as described above.

I. Ninth Embodiment

Figure 17:
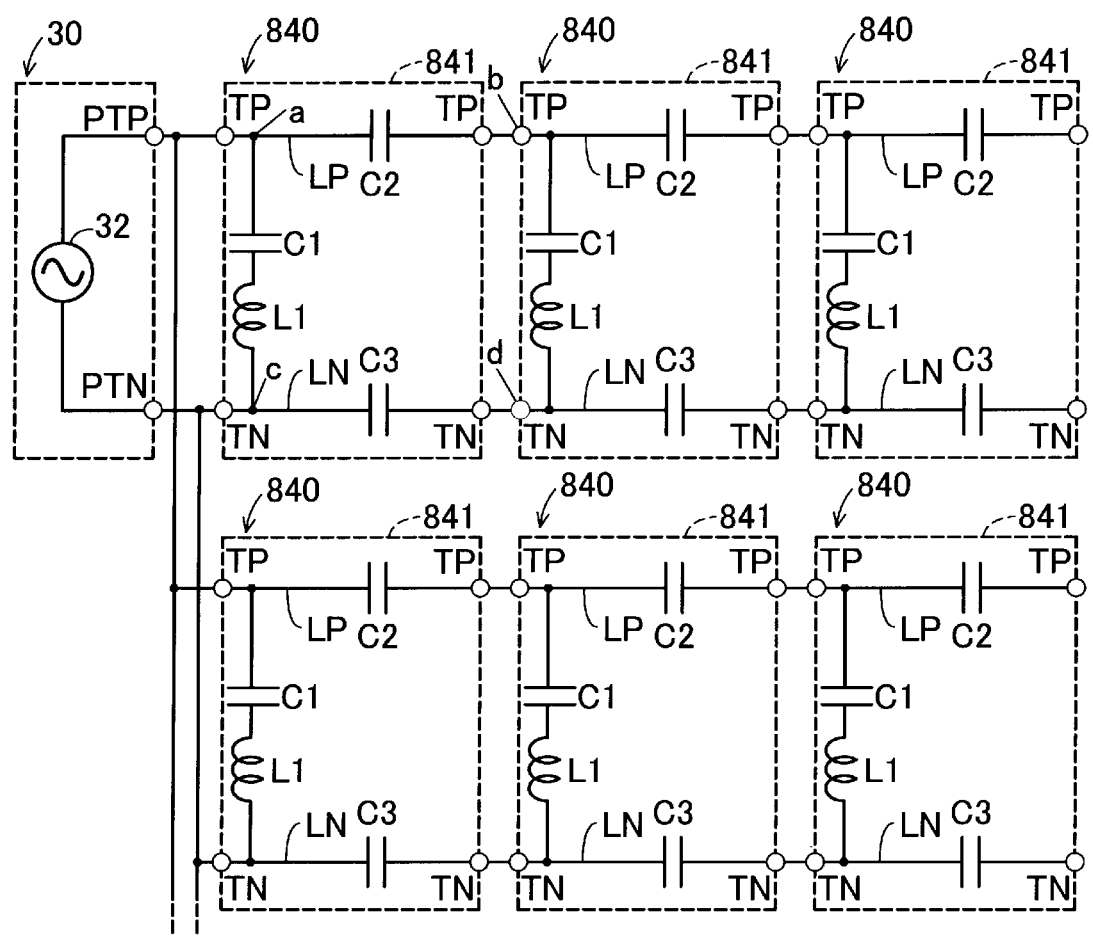
FIG. 17 is a circuit diagram which illustrates a power transmitter according to the ninth embodiment.

The power transmitter in the ninth embodiment is, as illustrated in FIG. 17, equipped with the coil assemblies 840 each of which includes the power transmitting resonant circuit 841 different in structure that in the second embodiment. Other arrangements are identical with those in the second embodiment, and explanation thereof in detail will be omitted here. Each of the power transmitting resonant circuits 841 includes the power feeding coil L1, the resonant capacitor C1, the first compensation capacitor C2, and the second compensation capacitor C3. The second compensation capacitor C3 is disposed on the second busbar LN between the second external connecting terminals TN in each of the coil assemblies 840. Specifically, the second compensation capacitor C3 has a first electrode connecting with one of the second external connecting terminals TN and a second electrode connecting with the other second external connecting terminal TN. The first compensation capacitors C2 and the second compensation capacitor C3 work to cancel inductances of the first busbar LP and the second busbar LN and bring the resonant frequency of the LC circuit into agreement with a target value. The first compensation capacitors C2 and the second compensation capacitor C3 also work to decrease a drop in voltage supplied to the downstream side. The capacitance C of the first compensation capacitors C2 is expressed by Eq. (1) above where L denotes the inductance of the first busbar LP between the points a and b in FIG. 17. Similarly, the capacitance C of the second compensation capacitor C3 is expressed by Eq. (1) above where L indicates the inductance of the second busbar LN between the points c and d in FIG. 17.

J. Tenth Embodiment

Figure 18:
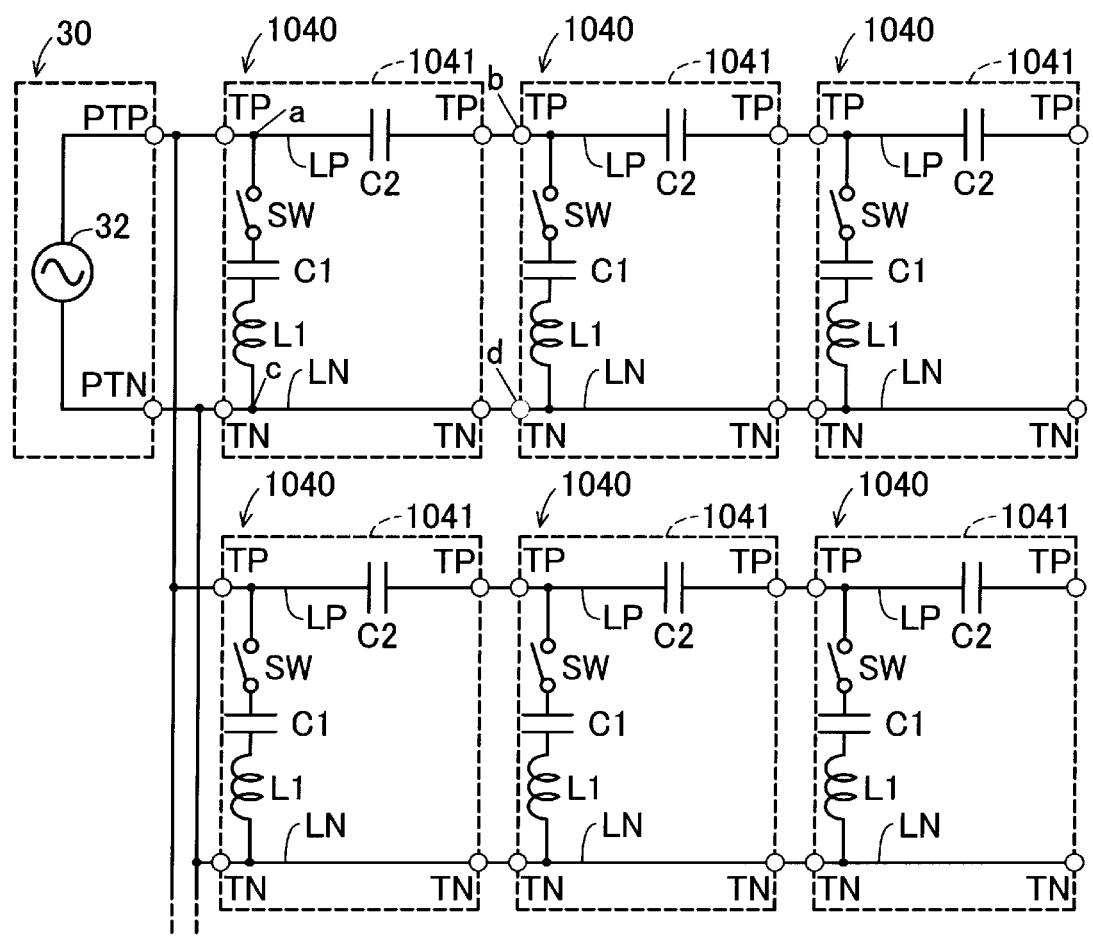
FIG. 18 is a circuit diagram which illustrates a power transmitter according to the tenth embodiment.
Figure 19:
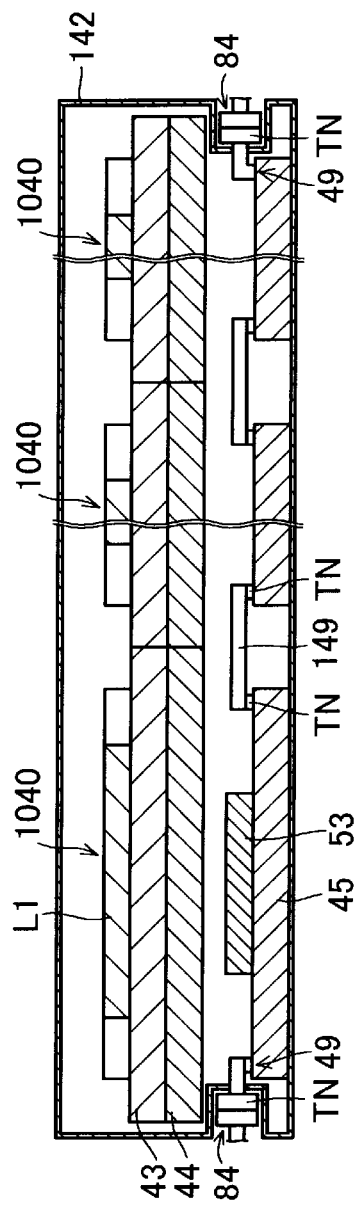
FIG. 19 is a sectional view which illustrates a coil assembly according to the tenth embodiment.

The power transmitter in the tenth embodiment is, as illustrated in FIG. 18, equipped with the coil assemblies 1040 each of which includes the power transmitting resonant circuit 1041. The power transmitting resonant circuit 1041 is, unlike the power transmitting resonant circuit 141 in the second embodiment, equipped with the switch SW. In FIGS. 18 and 19, the same reference numbers as employed in the first and second embodiments refer to the same parts. The resonant capacitor C1 has first and second electrodes. The first electrode connects with the power feeding coil L1. The switch SW is disposed between the second electrode of the resonant capacitor C1 and the first busbar LP. In this embodiment, the switch SW is selectively turned on or off by a control circuit, not shown, to have only one(s) of the coil assemblies 1040 resonate which is (are) used in transferring the electrical power to the vehicle 60. For instance, the LC circuit(s) of only one(s) of the coil assemblies 1040 above which the vehicle 60 lie is (are) activated to resonate. This results in a decrease in amount of electrical power consumed by the power transmitter 20.

Each of the coil assemblies 1040, as can be seen in FIG. 19, includes the core 43 and the shield 44 disposed between the power feeding coil L1 and the busbar substrate 45. Each of the coil assemblies 1040 also includes the switching circuit substrate 53 disposed between the busbar substrate 45 and the shield 44. The switching circuit substrate 53 has mounted thereon the switch SW and electronic parts constituting the control circuit. The switching circuit substrate 53 is discrete from the busbar substrate 45, but however, the first busbar LP, the second busbar LN, and an electronic component (i.e., the switch SW) may alternatively be mounted on a single circuit board.

K. Eleventh Embodiment

Figure 20:
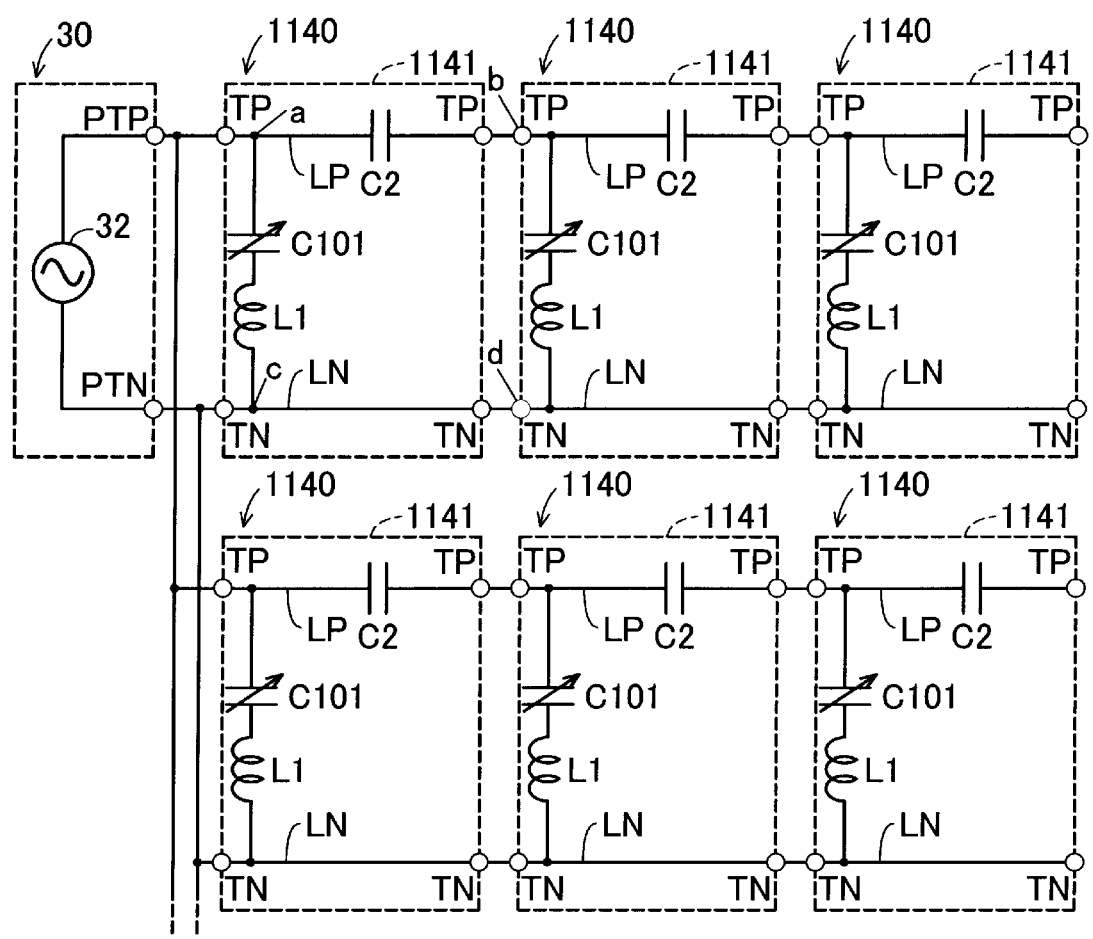
FIG. 20 is a circuit diagram which illustrates a power transmitter according to the eleventh embodiment.

The power transmitter in the eleventh embodiment is, as illustrated in FIG. 11, equipped with the coil assemblies 1140. Each of the coil assemblies 1140 includes the power transmitting resonant circuit 1141 which is, unlike the power transmitting resonant circuits 141 in the second embodiment, equipped with the resonant capacitor C101 made of a variable capacitor. In FIG. 20, the same reference numbers as employed in the first and second embodiments refer to the same parts. The resonant capacitor C101 has a variable capacitance which is intentionally changed by a control circuit, not shown. This enables only one(s) of the coil assemblies 1140 to resonate which is (are) used in transferring the electrical power to the vehicle 60. In other words, the resonant capacitor C101 in each of the coil assemblies 1140 is identical in function with the switch SW in the tenth embodiment. Specifically, in one(s) of the coil assemblies 1140 which are not used in the power transfer, the capacitance of the resonant capacitor(s) C101 is set greater or smaller than a target value, thereby causing only one(s) of the coil assemblies 1140 above which the vehicle 60 lies to have the LC circuit(s) thereof resonate, which reduces the amount of electrical power consumed by the power transmitter 20.

L. Other Embodiments

L1. The above embodiments have the plurality of external connecting terminals connecting with the power supply. The above-described structures of the coil assemblies 40 may, however, be employed when the external connecting terminals are electrically connected to a signal source or generator which outputs, for example, CAN (Controller Area Network) signals and/or drive signals. For instance, the transmission of signals from the signal generator to the second coil assemblies 40B is achieved by electrically connecting the signal generator to the first external connecting terminals TP of the first coil assemblies 40A and also electrically connecting the first external connecting terminals TP of the first coil assemblies 40A to the first external connecting terminals TP of the second coil assemblies 40B. In such a case, each of the coil assemblies 40 is preferably designed to have a power supply busbar in addition to the first busbar LP to which the signal is transferred from the signal generator, but however, such a power supply busbar may be omitted. This structure improves the degree of freedom of layout of the coil assemblies 40. The external connecting terminals in the above embodiments are connected to the high-frequency power source 32, but however, may alternatively be connected to another type of ac power supply or a dc power supply/

L2. In the second embodiment, each of the coil assemblies 140 is, as described above, equipped with the first compensation capacitor C2, but however, the coil assemblies 140 may be designed to share the single first compensation capacitor C2 with each other. For instance, one of the coil assemblies 140 may be designed to have the first compensation capacitor C2, while the other coil assemblies 140 may not have the first compensation capacitors C2. Alternatively, some of the coil assemblies 140 may have the first compensation capacitors C2, while the other coil assemblies 140 may not have the first compensation capacitors C2. Such a structure offers substantially the same beneficial advantages as described above. The same may apply to the second compensation capacitor C3 in the ninth embodiment. In the structure in which one(s) of the coil assemblies 140 is (are) equipped with the first compensation capacitor(s) C2, and the other coil assemblies 140 are not equipped with the first compensation capacitors C2, the capacitance C of the first compensation capacitor(s) C2 is also expressed by Eq. (1) above where L indicates the sum of inductance of the first busbar(s) of one(s) of the coil assemblies 140 equipped with the first compensation capacitor(s) C2 and inductance of the first busbars of the other coil assemblies 140 not equipped with the first compensation capacitors C2.

L3. The second embodiment is designed to have the first busbar LP and the second busbar LN located adjacent to the busbar substrate 45 in each of the coil assemblies 140, but however, may alternatively be configured to have a busbar substrate which includes a stack of a first wiring layer and a wiring second layer and has the first busbar LP and the second busbar LN disposed on the first and second wiring layers, respectively, and stacked on one another in the Z-axis direction. This structure also offers substantially the same beneficial advantages as those described above.

L4. Each of the coil assemblies 40 in the first embodiment is equipped with the core 43 and the shield 44, but however, may alternatively be designed to have only one of the core 43 and the shield 44. The same applies to the second embodiment.

L5. The first external connecting terminals TP and the second external connecting terminals TN in the first embodiment are made of waterproof connectors, but however, may alternatively be made of non-waterproof connectors unless the first external connecting terminals TP and the second external connecting terminals TN are used in environments where they are required to have waterproof properties. In case of use in conditions which require the first external connecting terminals TP and the second external connecting terminals TN to have dust-resistant properties, they may also be made of dust-resistant and/or waterproofing connectors. Similarly, the first wire terminals 82 and the second wire terminals 85 may be made of non-waterproof connectors. The first housing connecting terminal HTP and the second housing connecting terminal HTN in the second embodiment may also be made of non-waterproof connectors. The first external connecting terminals TP of a respective adjacent two of the coil assemblies 140 in the second embodiment are connected together using the first busbar 146, but however, they may alternatively be joined together using high waterproofing cables. Similarly, the second external connecting terminals TN of a respective adjacent two of the coil assemblies 140 are connected together using the second busbar 149, but however, they may alternatively be joined together using high waterproofing cables.

L6. Each of the coil assemblies 40 in the first embodiment has the two first external connecting terminals TP and the two second external connecting terminals TN which are arranged on four corners of the coil housing 42, but however, the first external connecting terminals TP and the two second external connecting terminals TN may be, like in the second embodiment, arranged adjacent or close to each other. This layout enables the first power supply wires 81 and the second power supply wires 84 to be located adjacent to each other, thereby resulting in a decrease in inductance of the first power supply wires 81 and the second power supply wires 84.

This disclosure is not limited to the above embodiments, but may be realized by various embodiments without departing from the purpose of the disclosure. For instance, technical features described in the embodiments which correspond to those referred to in the summary of the invention may be replaced with each other or combined in different ways in order to solve at least a portion of the problems or ensure at least a portion of the beneficial effects. The technical features may be omitted unless otherwise they are stated as being essential in in principle.

What is claimed is:

1. A coil assembly for wireless power transmission comprising:
    a plurality of external connecting terminals;
    a power feeding coil;
    a resonant capacitor which electrically connects with the power feeding coil;
    busbars which electrically connect between the external connecting terminals;
    a core, wherein
    the plurality of external connecting terminals is inside a peripheral edge of the core.

2. The coil assembly as set forth in claim 1, wherein the core is between the power feeding coil and the busbars.

3. The coil assembly as set forth in claim 1, further comprising a shield.

4. The coil assembly as set forth in claim 3, wherein the plurality of external connecting terminals are inside a peripheral edge of the shield.

5. The coil assembly as set forth in claim 3, wherein the shield is between the power feeding coil and the busbars.

6. The coil assembly as set forth in claim 1, wherein the plurality of external connecting terminals include first external terminals and second external terminals.

7. A coil assembly for wireless power transmission comprising:
    a plurality of external connecting terminals;
    a power feeding coil;
    a resonant capacitor which electrically connects with the power feeding coil; and
    busbars which electrically connect between the external connecting terminals; wherein
    the plurality of external connecting terminals include three or more first external terminals and three or more second external terminals.

8. The coil assembly as set forth in claim 6, wherein the plurality of external connecting terminals include two of the first external terminals and two of the second external terminals,
    the busbars include a first busbar connecting the first external terminals together and a second busbar connecting the second external terminals together, the first busbar and the second busbar being adjacent each other, and
    the first busbar and the second busbar are adjacent to the power feeding coil.

9. The coil assembly as set forth in claim 6, wherein the first external terminals are different in configuration from the second external terminals.

10. A coil assembly for wireless power transmission comprising:
    a plurality of external connecting terminals that are power supply terminals;
    a power feeding coil;
    a resonant capacitor which electrically connects with the power feeding coil; and
    busbars which electrically connect between the plurality of external connecting terminals, the plurality of external connecting terminals including first external terminals and second external terminals; and;
    at least one of a first compensation capacitor and a second compensation terminal, the first compensation capacitor being on one of the busbars between the first external connecting terminals and electrically connected with the first external connecting terminals, the second compensation capacitor being on one of the busbars between the second external connecting terminals and electrically connected with the second external connecting terminals.

11. The coil assembly as set forth in claim 1, further comprising a busbar substrate which has the busbars mounted thereon, wherein
- each of the external connecting terminals is one of a first-mode external connecting terminal and a second-mode external connecting terminal, the first-mode external connecting terminal being on the busbar substrate, the second-mode external connecting terminal being on the busbar substrate in electrical connection with a coil terminal electrically connecting with one of the busbars on the busbar substrate,
- the power feeding coil is in a region whose shape is configured to conform with that of a rectangle from which corners thereof are omitted in a planar view thereof, and
- the first-mode external connecting terminals and the coil terminals electrically connecting with the second-mode external connecting terminals are in regions occupied by the corners of the rectangle in a planar view thereof.

12. A wireless power transmission system comprising:
- a power supply;
- a plurality of first coil assemblies; and
- a second coil assembly, wherein
- each of the first coil assemblies include:
  - a plurality of first-coil external connecting terminals,
  - a first-coil power feeding coil,
  - a first-coil resonant capacitor electrically connecting with the first-coil power feeding coil, and
  - a first-coil busbar electrically connecting between the first-coil external connecting terminals,
- the second coil assembly includes
  - at least one second-coil external connecting terminal,
  - a second-coil power feeding coil, and
  - a second-coil resonant capacitor electrically connecting with the second-coil power feeding coil,
- each of the first coil assemblies has at least one of the first-coil external connecting terminals which electrically connects with the power supply and to which electrical power is delivered from the power supply, and
- the second coil assembly electrically connects with one of the first coil assemblies and is supplied with the electrical power through the first-coil busbar of the one of the first coil assemblies.

13. A coil assembly for wireless power transmission comprising:
- a plurality of external connecting terminals;
- a power feeding coil;
- a resonant capacitor which electrically connects with the power feeding coil;
- busbars which electrically connect between the external connecting terminals; and
- a shield, wherein
- the plurality of external connecting terminals is inside a peripheral edge of the shield.

* * * * *